United States Patent
Arunachalam

(10) Patent No.: US 8,346,894 B2
(45) Date of Patent: Jan. 1, 2013

(54) REAL-TIME WEB TRANSACTIONS FROM WEB APPLICATIONS

(76) Inventor: Lakshmi Arunachalam, Menlo Park, CA (US)

( * ) Notice: Subject to any disclaimer, the term of this patent is extended or adjusted under 35 U.S.C. 154(b) by 0 days.

(21) Appl. No.: 12/628,066

(22) Filed: Nov. 30, 2009

(65) Prior Publication Data

US 2010/0306343 A1    Dec. 2, 2010

Related U.S. Application Data

(60) Division of application No. 11/980,185, filed on Oct. 30, 2007, now Pat. No. 8,037,158, which is a continuation-in-part of application No. 09/792,323, filed on Feb. 23, 2001, now Pat. No. 7,340,506, which is a division of application No. 09/296,207, filed on Apr. 21, 1999, now Pat. No. 6,212,556, which is a continuation-in-part of application No. 08/879,958, filed on Jun. 20, 1997, now Pat. No. 5,987,500, which is a division of application No. 08/700,726, filed on Aug. 5, 1996, now Pat. No. 5,778,178.

(60) Provisional application No. 60/006,634, filed on Nov. 13, 1995.

(51) Int. Cl.
*G06F 13/00* (2006.01)

(52) U.S. Cl. .......... 709/219; 709/225; 719/329

(58) Field of Classification Search .......... 709/217, 709/219, 223, 225; 719/328, 329
See application file for complete search history.

(56) References Cited

U.S. PATENT DOCUMENTS

| | | |
|---|---|---|
| 4,829,372 A | 5/1989 | McCalley et al. |
| 4,851,988 A | 7/1989 | Trottier et al. |
| 4,984,155 A | 1/1991 | Geler et al. |
| 5,125,091 A | 6/1992 | Staas, Jr. et al. |
| 5,148,474 A | 9/1992 | Haralambopoulos et al. |
| 5,159,632 A | 10/1992 | Crandall |
| 5,231,566 A | 7/1993 | Blutinger et al. |
| 5,239,662 A | 8/1993 | Danielson et al. |
| 5,285,383 A | 2/1994 | Lindsey et al. |
| 5,295,139 A | 3/1994 | Palmer |
| 5,297,249 A | 3/1994 | Bernstein et al. |
| 5,329,589 A | 7/1994 | Fraser et al. |
| 5,329,619 A | 7/1994 | Page et al. |
| 5,347,632 A | 9/1994 | Filepp et al. |
| 5,367,635 A | 11/1994 | Bauer et al. |
| 5,383,113 A | 1/1995 | Kight et al. |

(Continued)

FOREIGN PATENT DOCUMENTS

WO    WO 97/18515 A1    5/1997

(Continued)

OTHER PUBLICATIONS

U.S. Appl. No. 12/628,060, filed Nov. 30, 2009, Arunachalam.

(Continued)

*Primary Examiner* — Viet Vu

(57) ABSTRACT

The present invention provides a method and apparatus for providing real-time, two-way transactional capabilities on the Web. Specifically, one embodiment of the present invention discloses a method for enabling object routing, the method comprising the steps of creating a virtual information store containing information entries and attributes associating each of the information entries and the attributes with an object identity, and assigning a unique network address to each of the object identities. A method is also disclosed for enabling service management of the value-added network service, to perform OAM&P functions on the services network

19 Claims, 13 Drawing Sheets

U.S. PATENT DOCUMENTS

| | | |
|---|---|---|
| 5,404,523 A | 4/1995 | Dellafera et al. |
| 5,408,619 A | 4/1995 | Oran |
| 5,414,812 A | 5/1995 | Filip et al. |
| 5,428,792 A | 6/1995 | Conner et al. |
| 5,432,937 A | 7/1995 | Tevanian et al. |
| 5,434,974 A | 7/1995 | Loucks et al. |
| 5,440,744 A | 8/1995 | Jacobson et al. |
| 5,442,771 A | 8/1995 | Filepp et al. |
| 5,442,791 A | 8/1995 | Wrabetz et al. |
| 5,444,192 A | 8/1995 | Shetye et al. |
| 5,446,896 A | 8/1995 | Hegarty et al. |
| 5,452,433 A | 9/1995 | Nihart et al. |
| 5,455,903 A | 10/1995 | Jolissaint et al. |
| 5,475,819 A | 12/1995 | Miller et al. |
| 5,491,800 A | 2/1996 | Goldsmith et al. |
| 5,517,645 A | 5/1996 | Stutz et al. |
| 5,519,868 A | 5/1996 | Allen et al. |
| 5,537,464 A | 7/1996 | Lewis et al. |
| 5,539,909 A | 7/1996 | Tanaka et al. |
| 5,557,780 A | 9/1996 | Edwards et al. |
| 5,560,005 A | 9/1996 | Hoover et al. |
| 5,577,251 A | 11/1996 | Hamilton et al. |
| 5,590,197 A | 12/1996 | Chen et al. |
| 5,592,378 A | 1/1997 | Cameron et al. |
| 5,604,905 A | 2/1997 | Tevanian et al. |
| 5,613,148 A | 3/1997 | Bezviner et al. |
| 5,664,111 A | 9/1997 | Nahan et al. |
| 5,671,279 A | 9/1997 | Elgamal et al. |
| 5,677,708 A | 10/1997 | Matthews, III et al. |
| 5,677,955 A | 10/1997 | Doggett et al. |
| 5,694,549 A | 12/1997 | Carlin et al. |
| 5,703,344 A | 12/1997 | Bezy et al. |
| 5,706,442 A | 1/1998 | Anderson et al. |
| 5,708,780 A | 1/1998 | Levergood et al. |
| 5,710,887 A * | 1/1998 | Chelliah et al. ............ 705/26.62 |
| 5,712,913 A | 1/1998 | Chaum |
| 5,715,314 A | 2/1998 | Payne et al. |
| 5,715,444 A | 2/1998 | Danish et al. |
| 5,724,424 A | 3/1998 | Gifford |
| 5,737,533 A * | 4/1998 | de Hond ....................... 709/219 |
| 5,742,762 A | 4/1998 | Scholl et al. |
| 5,742,768 A | 4/1998 | Gennaro et al. |
| 5,745,681 A | 4/1998 | Levine et al. |
| 5,754,939 A | 5/1998 | Herz et al. |
| 5,757,917 A | 5/1998 | Rose et al. |
| 5,758,072 A | 5/1998 | Filepp et al. |
| 5,758,327 A | 5/1998 | Gardner et al. |
| 5,771,354 A | 6/1998 | Crawford |
| 5,774,670 A | 6/1998 | Montulli |
| 5,778,178 A | 7/1998 | Arunachalam |
| 5,780,780 A | 7/1998 | Ahmed |
| 5,781,631 A | 7/1998 | Chaum |
| 5,793,964 A * | 8/1998 | Rogers et al. ................. 709/202 |
| 5,794,221 A | 8/1998 | Egendorf |
| 5,794,234 A | 8/1998 | Church et al. |
| 5,809,483 A | 9/1998 | Broka et al. |
| 5,812,779 A | 9/1998 | Ciscon et al. |
| 5,822,569 A | 10/1998 | McPartlan et al. |
| 5,826,085 A | 10/1998 | Bennett et al. |
| 5,826,241 A | 10/1998 | Stein et al. |
| 5,828,666 A | 10/1998 | Focsaneanu et al. |
| 5,835,726 A | 11/1998 | Shwed |
| 5,845,061 A | 12/1998 | Miyamoto et al. |
| 5,845,073 A | 12/1998 | Carlin et al. |
| 5,845,265 A | 12/1998 | Woolston |
| 5,856,974 A | 1/1999 | Gervais et al. |
| 5,859,978 A | 1/1999 | Sonderegger et al. |
| 5,864,866 A | 1/1999 | Henckel et al. |
| 5,870,473 A | 2/1999 | Boesch et al. |
| 5,870,724 A | 2/1999 | Lawlor et al. |
| 5,873,072 A | 2/1999 | Kight et al. |
| 5,873,093 A | 2/1999 | Williamson et al. |
| 5,878,043 A | 3/1999 | Casey et al. |
| 5,878,140 A | 3/1999 | Chaum |
| 5,878,141 A | 3/1999 | Daly et al. |
| 5,878,403 A | 3/1999 | DeFrancesco et al. |
| 5,884,301 A | 3/1999 | Takano |
| 5,889,957 A | 3/1999 | Ratner et al. |
| 5,890,137 A | 3/1999 | Koreeda |
| 5,890,161 A | 3/1999 | Helland et al. |
| 5,892,821 A | 4/1999 | Turner |
| 5,893,076 A | 4/1999 | Hafner et al. |
| 5,895,454 A | 4/1999 | Harrington |
| 5,897,621 A | 4/1999 | Boesch et al. |
| 5,898,871 A | 4/1999 | Williamson et al. |
| 5,901,228 A | 5/1999 | Crawford |
| 5,909,492 A | 6/1999 | Payne et al. |
| 5,910,987 A | 6/1999 | Ginter |
| 5,913,040 A | 6/1999 | Rakavy et al. |
| 5,913,061 A | 6/1999 | Gupta et al. |
| 5,931,967 A | 8/1999 | Shimizu et al. |
| 5,946,509 A | 8/1999 | Morton et al. |
| 5,956,400 A | 9/1999 | Chaum et al. |
| 5,956,509 A | 9/1999 | Kevner |
| 5,958,004 A | 9/1999 | Helland et al. |
| 5,960,411 A | 9/1999 | Hartman et al. |
| 5,987,500 A | 11/1999 | Arunachalam |
| 6,003,085 A | 12/1999 | Ratner et al. |
| 6,014,651 A | 1/2000 | Crawford |
| 6,014,666 A | 1/2000 | Helland et al. |
| 6,049,785 A | 4/2000 | Gifford |
| 6,049,819 A | 4/2000 | Buckle et al. |
| 6,055,514 A | 4/2000 | Wren |
| 6,055,567 A | 4/2000 | Ganesan et al. |
| 6,073,237 A | 6/2000 | Ellison et al. |
| 6,092,053 A | 7/2000 | Boesch et al. |
| 6,094,673 A | 7/2000 | Dilip et al. |
| 6,101,482 A | 8/2000 | DeAngelo et al. |
| 6,101,527 A | 8/2000 | Lejeune et al. |
| 6,119,152 A | 9/2000 | Carlin et al. |
| 6,125,185 A | 9/2000 | Boesch |
| 6,125,352 A | 9/2000 | Franklin et al. |
| 6,128,315 A | 10/2000 | Takeuchi |
| 6,134,594 A | 10/2000 | Helland et al. |
| 6,135,646 A | 10/2000 | Kahn et al. |
| 6,145,090 A | 11/2000 | Yamaguchi et al. |
| 6,185,609 B1 | 2/2001 | Rangarajan et al. |
| 6,192,250 B1 | 2/2001 | Buskens et al. |
| 6,205,433 B1 | 3/2001 | Boesch et al. |
| 6,212,556 B1 | 4/2001 | Arunachalam |
| 6,212,634 B1 | 4/2001 | Geer et al. |
| 6,249,291 B1 | 6/2001 | Popp et al. |
| 6,279,001 B1 | 8/2001 | DeBettencourt et al. |
| 6,289,322 B1 | 9/2001 | Kitchen et al. |
| 6,295,522 B1 | 9/2001 | Boesch |
| 6,301,601 B1 | 10/2001 | Helland et al. |
| 6,327,577 B1 | 12/2001 | Garrison et al. |
| 6,327,579 B1 | 12/2001 | Crawford |
| 6,334,116 B1 | 12/2001 | Ganesan et al. |
| 6,360,262 B1 | 3/2002 | Guenthner et al. |
| 6,363,362 B1 | 3/2002 | Burfield et al. |
| 6,411,943 B1 | 6/2002 | Crawford |
| 6,453,426 B1 | 9/2002 | Gamache et al. |
| 6,457,066 B1 | 9/2002 | Mein et al. |
| 6,473,740 B2 | 10/2002 | Cockrill et al. |
| 6,473,791 B1 | 10/2002 | Al-Ghosein et al. |
| 6,486,895 B1 | 11/2002 | Robertson et al. |
| 6,490,567 B1 | 12/2002 | Gregory |
| 6,553,427 B1 | 4/2003 | Chang et al. |
| 6,574,607 B1 | 6/2003 | Carter et al. |
| 6,625,581 B1 | 9/2003 | Perkowski |
| 6,678,664 B1 | 1/2004 | Ganesan |
| 6,678,696 B1 | 1/2004 | Helland et al. |
| 6,714,962 B1 | 3/2004 | Helland et al. |
| 6,839,677 B2 | 1/2005 | Mathur et al. |
| 6,850,996 B2 | 2/2005 | Wagner |
| 6,856,974 B1 | 2/2005 | Ganesan et al. |
| 6,931,111 B1 | 8/2005 | Coffee |
| 6,932,268 B1 | 8/2005 | McCoy et al. |
| 6,948,063 B1 | 9/2005 | Ganesan et al. |
| 7,076,784 B1 | 7/2006 | Russell et al. |
| 7,080,051 B1 | 7/2006 | Crawford |
| 7,107,244 B2 | 9/2006 | Kight et al. |
| 7,120,602 B2 | 10/2006 | Kitchen et al. |
| 7,146,338 B2 | 12/2006 | Kight et al. |
| 7,175,074 B2 | 2/2007 | Mejias et al. |
| 7,177,846 B2 | 2/2007 | Moenickheim et al. |

| | | | |
|---|---|---|---|
| 7,213,003 B1 | 5/2007 | Kight et al. | |
| 7,240,031 B1 | 7/2007 | Kight et al. | |
| 7,251,656 B2 | 7/2007 | Keown et al. | |
| 7,296,004 B1 | 11/2007 | Garrison et al. | |
| 7,302,408 B2 | 11/2007 | Engdahl et al. | |
| 7,302,411 B2 | 11/2007 | Ganesan et al. | |
| 7,330,831 B2 | 2/2008 | Biondi et al. | |
| 7,334,128 B2 | 2/2008 | Ganesan et al. | |
| 7,340,506 B2 | 3/2008 | Arunachalam | |
| 7,366,696 B1 | 4/2008 | Ganesan et al. | |
| 7,366,697 B2 | 4/2008 | Kitchen et al. | |
| 7,383,226 B2 | 6/2008 | Kight et al. | |
| 7,389,514 B2 | 6/2008 | Russell et al. | |
| 7,392,223 B1 | 6/2008 | Ganesan et al. | |
| 7,395,243 B1 | 7/2008 | Zielke et al. | |
| 7,395,319 B2 | 7/2008 | Harris et al. | |
| 7,451,400 B2 | 11/2008 | Bales et al. | |
| 7,590,550 B2 | 9/2009 | Schoenberg | |
| 7,600,027 B2 | 10/2009 | Yan | |
| 2001/0037318 A1 | 11/2001 | Lindskog | |
| 2002/0062218 A1 | 5/2002 | Pianin | |
| 2002/0152200 A1 | 10/2002 | Krichilsky et al. | |
| 2003/0069922 A1 | 4/2003 | Arunachalam | |
| 2008/0091801 A1 | 4/2008 | Arunachalam | |
| 2009/0094347 A1 | 4/2009 | Ting et al. | |

FOREIGN PATENT DOCUMENTS

WO      WO 00/63781 A1    10/2000

OTHER PUBLICATIONS

U.S. Appl. No. 12/628,066, filed Nov. 30, 2009, Arunachalam.
U.S. Appl. No. 12/628,068, filed Nov. 30, 2009, Arunachalam.
U.S. Appl. No. 12/628,069, filed Nov. 30, 2009, Arunachalam.
Order, Motion to Bifurcate and for early trial on the Issue of Inequitable Conduct, on Mar. 19, 2009, Dismissal with Prejudice, order dated Dec. 30, 2009, Denied as Moot, Order Granted, signed by JJF, C.A. No. 08-131 (JJF), Allstate Docket #155.
Order, Motion to Bifurcate and for early trial on the Issue of Inequitable Conduct, on Mar. 19, 2009, Dismissal with Prejudice, order dated Dec. 30, 2009, Denied as Moot, C.A. No. 08-132 (JJF) and C.A. No. 08-133 (JJF), Dell Docket #155, signed by JJF, Order, Motion to Bifurcate and for early trial on the Issue of Inequitable Conduct, on Mar. 19, 2009, Dismissal with Prejudice, order dated Dec. 30, 2009, Denied as Moot, C.A. No. 08-132 (JJF) and C.A. No. 08-133 (JJF), Dell Docket #155.
Plaintiff WebxChange Inc.'s Surreply in Opposition to Defendants' Motion to Bifurcate, and for Early Trial on, the Issue of Inequitable Conduct (C.A. No. 08-132 (JJF) and C.A. No. 08-133 (JJF) , is Granted Plaintiff's Surreply in Opposition to Defendant's Motion to Bifurcate and for Early Trail on, The Issue on Inequitable Conduct is deemed filed (Entered Dec. 30, 2009), Dell Docket #157.
Dell Inc.'s Second Amended Answer and Counterclaims to WebxChange Inc.'s Original Complaint for Patent Infringement (Entered: Jan. 20, 2010), Dell Docket #164.
Plaintiff WebxChange Inc.'s Surreply in Opposition to Defendants' Motion to Bifurcate, and for Early Trial on, The Issue of Inequitable Conduct (Entered Dec. 30, 2009), Fedex Docket #212.
Memorandum Opinion C.A. 08-133-JJF, and C.A. 08-132-JJF (Entered Dec. 30, 2009), Fedex Docket #215.
Defendant's Fedex Corporation, Fedex Kinko's Office & Print Services, Inc., and Fedex Corporate Services, Inc.'s Second Amended Answer, Affirmative Defenses, and Counterclaims to Plaintiff WebXchange, Inc.'s Complaint (Entered Jan. 20, 2010), Fedex Docket #217.
U.S. Appl. No. 60/208,057, filed May 31, 2000, Krichilsky.
U.S. Appl. No. 08/168,519, filed Dec. 1993, Gifford.
UIUC, "The Common Gateway Interface", pp. 1-4, http:/hoohoo.ncsa.uiuc.edu/cgi/primer.html, Retrieved on May 22, 2001, WBX 000.
Arnold, K. et al., "Media-Independent Interfaces in a Media-Dependent World", USENIX Conference on Object-Oriented Technologies, Monterey, CA Jun. 1995, WBX001.
Arshad, K.M. et al., "A CORBA based framework for trusted E-Commerce Transactions", Enterprise Distributed Object Computing Conference, pp. 18-25, EDOC '99 Sep. 27, 1999, WBX002.
Atkinson, R. , RFC 1825: "Security Architecture for the Internet Protocol", Naval Research Laboratory, Category: Standards Track, Network Working Group, Aug. 1, 1995 , WBX007.
Banks, M. , "America Online: A Graphics-based Success", Link-Up, Jan./Feb. 1992 , WBX008.
Banks, M. , "Compuserve for Windows", M.I.S Press, 1994, WBX009.
Baquero, C.et al.,"Integration of Concurrency Control in a Language with Subtyping and Subclassing",USENIX Conference on Object-Oriented Technologies, Jun. 1995,WBX010.
Barron, C. and Weil, B., "Dr. Dobbs Portal: Implementing a Web Shopping Cart", Online Transactions in PERL, Sep. 1, 1996 WBX011.
Bharat, K. et al. , "Visual Obliq: A System for Building Distributed, Multi-User Applications by Direct Manipulation", SRC 130a, DEC, Oct. 31, 1995, WBX012.
Bharat,K.et al.,"Distributed Applications in a Hypermedia Setting", Proc. Intl Workshop on Hypermedia Design,http.www.cc.gatech.edugvupeoplePhDKrishnalWHD.html,Jun. 1, 1995 WBX013.
"CyberCash Cash Register Internet Payment Service". retrieved May 23, 2001 http://www.cybercash.com/ cashregister pp. 1-2. 1996, WBX034.
"CyberCash—Cash Register—How it Works" retrieved May 23, 2001http://www.cybercash.com/cashregister/howitworks.html pp. 1-3. 1996, WBX035.
"CyberCash—Industry Leading Features" retrieved May 23, 2001 http://www.cybercash.com/cashregister/features.html pp. 1-4. 1996, WBX036.
"CyberCash Cash Register—Online Secure Payment Service" CashRegister Demos.retrieved May 23, 2001 http://www.webdata.cybercash.com/demos/ pp. 1-2. 1996, WBX038.
"CyberCash FraudPatrol.TM. Service" retrieved May 23, 2001 http://www.cybercash.com/fraudpatrol/ pp. 1-2. 1996, WBX039.
"CyberCash FraudPatrol—How It Works" retrieved on May 23, 2001 http://www.cybercash.com/fraudpatrol/howitworks.html pp. 1-2 '96, WBX040.
"CyberCash Home", http://www.cybercash.com [retrieved on May 23, 2001] 1996, WBX041.
"CyberCash ICVerify for Windows" Version 2.5 Upgrade, http://www.cybercash.com/icverify/upgrade.html pp. 1-2 [retrieved on May 23, 2001] 1996 , WBX043.
Cybercash, "ICVERIFY—Features" retrieved on May 23, 2001 http://www.cybercash.com/icverify/features.html, 1996, pp. 1-3, WBX044.
Brando, T., "Comparing DCE and CORBA", Mitre Document MP 95B-93, Mar. 1, 1995, WBX018.
Business Wire , "Open Market releases first complete software solution" 1995, WBX025.
Business Wire, "Sunsoft delivers early access release of Distributed Objects Environment", Jun. 14, 1995, WBX026.
Case, J. et al. , "Network Management and the Design of SNMP", Connexxions (ISSN 0894-5926), vol. 3, No. 3, Mar. 1989, WBX027.
Chung, S. et al., "A Heterogeneous Distributed Information System", IEEE, pp. 443-447, 1993, WBX029.
Courtney, A.,"Phantom: An Interpreted Language for Distributed Programming", Proceedings of USENIX Conference on Object-Oriented Technologies, Monterey, CA, Jun. 1995, WBX030.
Cybercash, "Affiliate Marketing Service", http://www.cybercash.com/products/affiliatemarketing.html [retrieved on May 23, 2001] 1996, WBX031.
"CyberCash B2B Payment Services", http://www.cybercash.com/b2b pp. 1-2 [retrieved May 23, 2001] 1996, WBX032.
CyberCash B2BServices, 1996, WBX033.
CyberCash Cash Register Internet Payment Service—Online Secure Payment Service. retrieved on May 23, 2001from http://www.cybercah.com/cashregister pp. 1-2,'96,WBX034.
"CyberCash—Cash Register—How it Works" retrieved May 23, 2001 from http://www.cybercash.com/cashregister/howitworks.html pp. 1-3. '96,WBX035.
"CyberCash—Industry Leading Features",retrieved May 23, 2001 http://www.cybercash.com/cashregister/features.html pp. 1-4, 1996, WBX 036.

"CyberCash Cash Register—Online Secure Payment Service" CashRegister Demos.retrieved May 23, 2001 http://www.webdata.cybercash.com/demos/pp. 1-2 1996, WBX038.

"CyberCash FraudPatrol.TM. Service" retrieved on May 23, 2001 http://www.cybercash.com/fraudpatrol/ pp. 1-2. 1996, WBX039.

"CyberCash FraudPatrol—How It Works" retrieved onMay 23, 2001, http://www.cybercash.com/fraudpatrol/howitworks.html pp. 1-2 1996,WBX 040.

Cybercash, "ICVERIFY—Features" retrieved on May 23, 2001 from http://www.cybercash.com/icverify/features.html, 1996, pp. 1-3, WBX044.

Cybercash, "Payment Software for Brick and Mortar Merchants" http://www.cybercash.com/pcauthorize 1996-2001, WBX046.

Dr. Gui on Components, COM and ATL, http://msdn.microsoft.com/library/welcome/dsmsdn/msdn_drguion020298.htm, Feb. 2, 1998, pp. 1-61 [retrieved on May 22, 2001], WBX057.

Cybercash,"Products" 1996. retrieved on May 23, 2001 from <URL:http://www.CyberCash.com/products/, 1996, pp. 1-2, WBX048.

Cybercash,"WebAuthorize—Enterprise and Hosting Payment Processing". retrieved on May 23, 2001from <URL:http://www.cybercash.com/webauthorize/,1996,pp. 1-2, WBX050.

Davis et al., "A Protocol and Server for a Distributed Digital Technical Report Library", Apr. 25, 1994, WBX051.

Davison, A. , "Coding with HTML forms HTML goes interactive", (hypertext markup language)(Tutorial), Dr. Dobb's Journal, Jun. 6, 1995, vol. 20, No. 6, 19 pages, WBX052a.

Davison, A. , "Coding with HTML forms: HTML goes interactive", Dr. Dobb's Journal, Jun. 6, 1995, vol. 20, No. 6, pp. 70-79, WBX052b.

"Distributed Object Technology in the Financial Services Industry: Trading and Risk Management", A White Paper, Sun Microsystems, 1995, WBX053.

Deng, R.H. et al. , "Integrating Security in CORBA-based Architectures", IEEE, Jun. 1995, pp. 50-61, WBX054.

Detlefs,D.et al., Debugging Storage Management Problems in Garbage Collected Environments, Proc of USENIX Conference on Object-Oriented Technologies, Monterey,CA,Jun. 1995,WBX055.

Dietinger, T. , Object-Oriented Implementation of a Multiprotocol Hyper-G client for MS-Windows, Diplomarbeit inTelematik, TU Graz, Jul. 1, 1995, WBX056.

Broadvision, "Broadvision One-to-One: On-line Marketing and Selling Application System Developers' Guide", 1995, WBX020.

Broadvision, "Broadvision One-to-One: On-Line Marketing and Selling Application System: Dynamic Command Center User's Guide", 1995, WBX021.

Broadvision, "Broadvision One-to-One: On-Line Marketing and Selling Application System: Installation and System Administration Guide" 1995, WBX022.

Broadvision, "Broadvision One-to-One: On-Line Marketing and Selling Application System: Technical Overview", 1995, WBX023.

Glossbrenner, A. , "MasterGuide to Compuserve", "Chapter 15: Travel Services: Join CompuServe and See the World", Prentice Hall, 1987, WBX065.

Gross,C.,"Taking the Splash Diving into ISAPI",ISAPI Programming,Microsoft Interactive Developer, www.Microsoft.com/mind/0197/ISAPI.htm,Jan. 1, 1997, pp. 1-10,retrievedMay 22, 2001 WBX066.

"Open Market Inc, Managing in a Turbulent Environment", Harvard Business School, 9-196-097, Aug. 29, 1996 , WBX067.

Hickey, M., "Shopping at Home: One Modem Line, No Waiting", Home PC, Dec. 1, 1994, p. 307, Dialog, File 647, Acc# 01038162, WBX068A.

Lang , "Cashing in: The Rush is on to Buy and Sell on the Internet But on Sidelines for Now", Advertising Age, Dec. 19, 1994, p. 11, Dialog, File 16, Acc# 05419137, WBX068B.

Lichty, T. , "America Online Tour Guide", Macintosh Edition, Version 2, Chapter 1, 3, 8,10, 1992, WBX068C.

Tymnet, Wikipedia, the free encyclopedia, http://en.wikipedia.org/wiki/tymnet, Retrieved on May 1, 2007, WBX068D.

Cox, B. et al. , "NetBill Security and Transaction Protocol", Carnegie Millon University, Pittsburgh, PA 15212-3890, undated, WBX068E.

Lamond, K. et al. , "Credit Card Transactions Real World and OnLine", http://www.virtualschool.edu/mon/ElectronProperty/klamond/credit_card.htm, 1996, pp. 1-16, WBX068F.

"Open Market Catalog Centre",Enterprise Content,/www.openmarket.com/cgi-bin/gx..cgi/AppLogic+FT-Content Server?pagename=FutureTense/Apps/Xcelerate/Render&c=Arti_ZZZ,WBX069.

Business Wire, High Beam Wire, "Open Market releases first complete software solution" Oct. 16, 1995, WBX070.

McCloghrie, K. et al. , RFC 1156, "Management Information Base for Network Management of TCP/IP-based internets", May 1, 1990 , WBX071.

Case, J. et al. , RFC 1157 May 1, 1990, WBX072.

Rose, M.. RFC 1283:"SNMP over OSI", Dec. 1, 1991, WBX073.

Rose, M. et al. , RFC 1155: "Structure and Identification of Management Information for TCP/IP-based internets", May 1, 1990, WBX074.

Case, J. et al. , RFC 1442: "Structure of Management Information for version 2 of the Simple Network Management Protocol (SNMPv2)", AllState 00011394 Apr. 1, 1993, WBX075.

"ORBIX Programmer's Guide", IONA Technologies, Oct. 1, 1997, WBX076A-E.

"ORBIX Programmer's Guide", Release 1.3.1, IONA Technologies, Feb. 1, 1995, WBX077.

Ito, J. et al., "Using meta-objects to support optimization in the Apertos Operating System", USENIX Conference on Object-Oriented Technologies, Monterey, CA, Jun. 1995, WBX078.

Jordan, M. et al., "Software Configuration Management in an Object-Oriented Database", USENIX Conference on Object-Oriented Technologies, Monterey,CA,Jun. 1995, WBX079.

Kane, P. , "Prodigy Made Easy", "Chapter 6, Shopping Made Easy", 2nd ed., 1993, WBX080.

Lagoze, C. et al. , "Dienst: Implementation Reference Manual", May 5, 1995, WBX081.

Open Market Commerce Products, Enterprise Content www.openmarket.com/cgi-bin/gx.cgi/ AppLogic+FTContentServer?pagename=FutureTense/Apps/Xcelerate/Render&c=A_ZZZ, WBX082.

Lange, D.B. et al., "Program Explorer: A Program Visualizer for C++", Proceedings of the USENIX Conference on Object-Oriented Technologies, Monterey, CA, Jun. 1995, WBX083.

Laufer. K. , "A Framework for Higher Order Functions in C++", Proceedings of the USENIX Conference on Object-Oriented Technologies, Monterey, CA, Jun. 1995, WBX084.

Li, G. and Bacon, J., "Supporting Distributed Real-Time Objects", IEEE Jul. 1994, pp. 138-143, WBX085.

Limprecht, R. , "Microsoft Transaction Server", IEEE, Compcon '97 Proceedings, 1997, pp. 14-18, WBX086.

Maffeis, S. , "Adding Group Communication and Fault-Tolerance to CORBA", Proceedings of the USENIX Conference on Object-Oriented Technologies, Monterey,CA, Jun. 1995 , WBX087.

Mahindra, A. et al. , "Dynamic Insertion of Object Services", Proceedings of the USENIX Conference on Object-Oriented Technologies, Monterey,CA, Jun. 1995, WBX088.

McCloghrie, K. et al. , RFC 1213, "Management Information Base for Network Management of TCP/IP-based internets: MIB-II", SNMP Working Group, Mar. 1, 1991, WBX089.

McCloghrie, K. et al., RFC 1447, "Party MIB for version 2 of the SIMPLE Network Management Protocol", SNMP Security Working Group, Apr. 1, 1993, WBX090.

McKie, S., "ERP Meets Web E-Commerce", DBMS, Jul. 1, 1998, WBX091.

McMaster D. et al., RFC 1516: "802.3 Repeater devices—Definition of Managed Objects", Feb. 9, 1992, WBX092.

"Allstate Connects with Countrywide Producer Network in Seven Months Using Microsoft Visual Studio.NET and the .NET Framework", Microsoft.NET Customer Solution, Jan. 2003, WBX 093.

O'Brien Jones , U.S. Appl. No. 90/010,346 Application which is the 5,778,178 Re-exam doc, Exhibits Part 1-WBX101, Exhibits Part 2-WBX102, Nov. 21, 2008 Third Party Requests, WBX094.

"Microsoft Component Services, Server Operating System, A Technology Overview", http://www.microsoft.com/com/wpaper/compsvcs.asp,Aug. 15, 1998, [retrieved on May 22, 2001],WBX095.

Allstate Uses Web Services to Quickly Create Insurance Policy Management Solution, Microsoft .NET Customer Solution Case Study, Jan. 2005, WBX098.

Mitchell et al., "An Overview of the Spring System", Sun Microsystems, WBX099.

Muckelbauer, P. and Russo, V.,"Lingua Franca: An IDL for Structured Subtyping Distributed Object Systems",USENIX Conference:Object-Oriented Technologies,Monterey,CA,WBX100.

Reynolds, J. Posting to comp doc USENET group, http://nyurl.com/53a95p, RFC 1212, 1213—Google groups on concise definitions MIB and MIBII, Exhibit G, Mar. 27, 1991, WBX045.

Relihan, L. et al., "Untangling the World-Wide Web.",12th Annual International Conference on Systems Documentation, Oct. 1, 1994, pp. 17-24, ACM, WBX102A.

Rose, M. T., "The Simple Book: An Introduction to Internet Management", 1994, pp. 14-15, 379-387 (2nd ed.) Exhibit F, WBX102C.

"Open Market Enterprise: Content Server",www.openmarket.com/cgi-bin/gx.cgi/AppLogic+FTContentServer?pagename=FutureTense/Apps/Xceleratlerate/Render&c=Artic, pp. 1-4,WBX103.

"Open Market Enterprise:Content Center", www.openmarket.com/cgi-bin/gx.cgi/AppLogic+FTContentServer?pagename=FutureTense/Apps/Xcelerate/Render&c=Artic,RetrvdMay 15, 2001, WBX104.

"Open Market Enterprise:Content-Driven eBusiness", www.openmarket.com/cgi-bin/gx.cgi/AppLogic+FT ContentServer?pagename=FutureTense/Apps/Xcelerate/Render &c=Artic, WBX105.

"Open Market ShopSite 5.0", Retrieved on May 15, 2001 from:<URLhttp://www.openmarket.com/cgi-bin/gx.cgi/AppLogic+FTCont- entServer?pagename=Future Tense/Apps, WBX 112.

Orfali, R. et al., "Essential Client/Server Survival Guide"—John Wiley and Sons—Set 1, 1994, WBX114.

Orfali, R. et al., "Essential Client/Server Survival Guide"—John Wiley and Sons—Set 2, 1994, WBX115.

Orfali, R.; Harkey, D.; Edwards, J., "Essential Client/Server Survival Guide" John Wiley and Sons, Sets 1-4, Jun. 16, 2005, WBX116.

Orfali, R. et al., "Essential Client/Server Survival Guide"—John Wiley and Sons—Set 4, 1994, WBX117.

Pavlou, G. et al. , "A Generic Management Information Base Browser", WBX119.

Peterson, L. et al. , "Computer Networks, A Systems Approach", Morgan Kaufmann Publishers, Inc., 1996, pp. 472-507, WBX120.

Pitkow, J. et al.,"Using the Web as a Survey Tool: Results from the Second WWW User Survey",conductedOct. 15& Nov. 1994,presented at 3rd Intl WWW Conference Oct. 10-14, 1995; WBX121.

Netscape Unveils New Versions of Commercial Applications for Enhanced Integration with Corporate Databases, NetScape Press Release, May 13, 1996, WBX122.

Raatikainen, K. , "Database Access in Intelligent Networks", Proceedings of IFIP TC6 Workshop on Intelligent Networks, pp. 163-183, WBX123.

"Solstice X.500 Programming Reference", SunSoft, 1996 , WBX135, A, B.

Tatters, W. , "Navigating the Internet with Compuserve: Chapter 17: Business on the Net", 1995, pp. 352-374, Sams Publishing, WBX136.

Technical Staff,"The Conductor Financial Services Framework":Distributed Objects on the Internet,Block Financial Corporation White Paper,BFC Technology Center, Oct. 17, 1995WBX137.

Vogler, H. et al.,"The Transaction Internet Protocol in Practice: Reliability for WWW Applications",IEEE 1999 Internet Workshop IWS99,(ISSN-0-7803-5925-9),Feb. 18, 1992,WBX146.

Weich, C.,"Generic Containers for a Distributed Object Store", Prcgs of the USENIX Conference (Jun. 1995) on Object-Oriented Technologies, Monterey,CA, May 18, 1995,WBX150.

"SmallTalk" Wikipedia SmallTalk http://www.objs.com/x3h7/smalltalk.htm and http://en.wikipedia.org/wiki/Smalltalk WBX151.

Wollrath, A. et al. , "Simple Activation for Distributed Objects", Proceedings of the USENIX Conference on Object-Oriented Technologies, Monterey, CA, Jun. 1995, WBX152.

USENIX , "Agenda of Proceedings of the USENIX Conference on Object-Oriented Technologies", Monterey, CA, Jun. 1995, WBX153.

"Common Desktop Environment: Desktop Kornshell User's Guide", Sun Microsystems, 1994-1995 , WBX154.

"Common Desktop Environment: Help System Author's and Programmer's Guide", Sun Microsystems, 1994-1995, (Three parts) WBX155.

"Common Desktop Environment: Internationalization Programmer's Guide", Sun Microsystems, 1994-1995, WBX156.

"Common Desktop Environment: Tooltalk Messaging Overview", Sun Microsystems, 1994-1995 , WBX157.

"Common Desktop Environment: Common StyleGuide and Certification CheckList", SunSoft, 1994-1995 , WBX158, 158C.

"Common Desktop Environment: Programmer's Overview", SunSoft, 1994-1995 , WBX159.

Developer's Guide to Internationalization, Sun Microsystems, 1994, WBX160.

"Dr. Gui's Gentle Guide to COM", http://www.microsoft,com/Com/news/drgui.asp [retrieved on May 22, 2001], Nov. 1, 1999, WBX161.

"iPIN Company Info", http://www.ipin.com/01comp.html [retrieved on May 23, 2001], iPIN Interactive Transaction Services, Inc., 2000, WBX162.

"iPIN Home", http://www.ipin.com [retrieved on May 23, 2001], iPIN Interactive Transaction Services, Inc., 2000, WBX163.

"iPIN Service Options", http://www.ipin.com/02prod_service.html [retrieved on May 23, 2001], iPIN Interactive Transaction Services, Inc., 2000, WBX164.

"iPIN Solutions", http://www.ipin.com/02prod_solution.html [retrieved on May 23, 2001], iPIN Interactive Transaction Services, Inc., 2000, WBX165.

"iPIN Partners", http://www.ipin.com/03part.html [retrieved on May 23, 2001], iPIN Interactive Transaction Services, Inc., 2000, WBX166.

"iPIN Technology", http://www.ipin.com/02prod_tech.html [retrieved on May 23, 2001], iPIN Interactive Transaction Services, Inc., 2000, WBX167.

NetScape Products: Open and Secure Internet Software, 1995, WBX168A.

NetScape Merchant System, Data Sheet 1995, WBX168B.

NetScape Internet Applications, Customer Showcase 1995, WBX168C.

NetScape Server API, 1995, WBX 168D.

NetScape Object-Oriented Pradigm of Server Configuration, 1995, WBX168E.

RSA: Verisign Redirection Information, Important Announcement 1995, WBX168F.

RSA: Verisign to Provide Digital IDs for Open Market's Secure WebServer, 1995, WBX168G.

Verisign Adds the Missing Component to Online Security Solutions 1995, WBX168H.

Hickman, K.E.B.; Netscape, "The SSL Protocol", 1995, WBX168I.

NetScape iStore DataSheet, 1995, WBX168J.

Choudhury, A.K. et al. , "Copyright Protection for Electronic Publishing over Computer Networks", 1995 IEEE Network, 9, May/June, vol. 3 pp. 12-20 (1995) WBX168L.

NSAPI Basics, (Chapter 1) http://developer.netscape.com/docs/manuals/enterprise/nsapi/svrop.htm [retrieved on May 22, 2001], 1997, WBX174.

"OpenStep User Interface Guidelines", SunSoft, 1996, WBX175.

"OpenStep Programming Reference", SunSoft, 1996 , (12 parts) WBX176.

"QuickStart to Using the Open Step Desktop", SunSoft, 1996, WBX177.

Rose, M. et al. , "RFC 1065:Structure and Identification of Management Information for TCP/IP-based internets",Aug. 1, 1988, WBX178.

Stewart, B. , RFC 1318: "Definition of Managed Objects for Parallel-printer-like Hardware Devices", Apr. 1, 1992 , WBX179.

Rivest, R., "RFC 1321: The MD5 Message-Digest Algorithm", 1997, WBX180.

Solaris Common Desktop Envirnment: MOTIF Transition Guide, SUN Microsystems, 1997, WBX181.

"Solaris Common Desktop Environment: Programmer's Guide", Sun Microsystems, 1994-1995, WBX182.
"The iPin Approach", http://www.ipin.com/02prod.html, 2000, [retrieved on May 23, 2001], Interactive Transaction Services, Inc., WBX183.
Orfali, R. et al., "The Essential Distributed Objects Survival Guide"—Part1-1, John Wiley and Sons, 1996, WBX201.
Orfali, R. et al., "The Essential Distributed Objects Survival Guide"—Part1-2, John Wiley and Sons, 1996, WBX202.
Orfali, R. et al., "The Essential Distributed Objects Survival Guide"—Part1-3, John Wiley and Sons, 1996, WBX203.
Orfali, R. et al., "The Essential Distributed Objects Survival Guide"—Part2-1, John Wiley and Sons, 1996, WBX204.
Orfali, R. et al., "The Essential Distributed Objects Survival Guide"—Part2-2, John Wiley and Sons, 1996, WBX205.
Orfali, R. et al., "The Essential Distributed Objects Survival Guide"—Part2-3, John Wiley and Sons, 1996, WBX206.
Orfali, R. et al., "The Essential Distributed Objects Survival Guide"—Part3-1, John Wiley and Sons, 1996, WBX207.
Orfali, R. et al., "The Essential Distributed Objects Survival Guide"—Part3-2, John Wiley and Sons, 1996, WBX208.
Orfali, R. et al., "The Essential Distributed Objects Survival Guide"—Part3-3, John Wiley and Sons, 1996, WBX209.
Orfali, R. et al., "The Essential Distributed Objects Survival Guide"—Part4-1, John Wiley and Sons, 1996, WBX210.
Orfali, R. et al., "The Essential Distributed Objects Survival Guide"—Part4-2, John Wiley and Sons, 1996, WBX211.
Orfali, R. et al., "The Essential Distributed Objects Survival Guide"—Part4-3, John Wiley and Sons, 1996, WBX212.
Orfali, R. et al., "The Essential Distributed Objects Survival Guide"—Part4-4, John Wiley and Sons, 1996, WBX213.
Broadvision, "Broadvision One-to-One: Programmer's Reference, Part 1" 1995, WBX214.
Broadvision, "Broadvision One-to-One: Programmer's Reference, Part 2" 1995, WBX215.
OMG, "The Common Object Request Broker: Architecture and Specification", CORBA v2.0_(NYC-#1655390-v1), Jul. 1995-1996, WBX216.
The Open Group, "Inter-domain Management: Specification Translation", 1997, WBX222.
The Open Group, "Inter-domain Management_Summary of Similarities and Differences", 1997, WBX223.
The Open Group, "Inter-domain Management_object models comparison", 1997, WBX224.
Miller, M., "Managing Internetworks with SNMP", 1993, pp. 138-139, M&T Books., '506 Inter Partes Re-examination Exhibit 12, Dec. 2008, WBX225.
Umar, A., "Distributed Computing: A Practical Synthesis", "Appendix B: Tutorial on TCP/IP Protocol Suite", (BellCore), 1993, WBX226.
Umar, A., "Distributed Computing: A Practical Synthesis", "Chapter 5: Client-Server Systems and Application—Interconnectivity", (BellCore), 1993, WBX227.
Spero,"Binary Gateway Interface—An API for Dynamically Extensible http Servers",Jul. 1, 1994, Retrieved on Apr. 5, 2009 from http://www.ibiblio.org/mdma-release/BGI-spec.txt, WBX228.
"Point, Click and Shop Never So Easy;The CheckFree Wallet",NewsHound,SJMercury News, PRNewswire,Apr. 10, 1995, Retrieved Apr. 5, 2009 from http://besser.tsoa.nyu.ed_ZZZ,WBX229.
DEC ObjBroker,1.0.9,Apr. 3, 1996,http://209.85.173.132/search?q=cache:c3iJxZca3aUJ:www.faqs.org/faqs/object-faq/part3/+DEC%27s+ObjectBroker+Service&cd=9&hl=en&ct=clnk&g_ZZZ,WBX230.
Arunachalam, U.S. Appl. No. 11/980,185_Duty of Candor Rule 56 Disclosure, Feb. 11, 2009, WBX220.
Arunachalam, U.S. Appl. No. 11/980,185_Duty of Candor Rule 56 Disclosure, Mar. 4, 2009, WBX221.
NYC-#1579692-v1-WebXchange_—_March_3_DELL_Complaint.DOC, Mar. 3, 2008, WBX217.
NYC-#1579751-v1-WebXchange_—_March_3_Allstate_Complaint.DOC, Mar. 3, 2008, WBX218.
NYC-#1579947-v1-WebXchange_—_March_3_FedEx_Complaint.DOC, Mar. 3, 2008, WBX219.
"Easel Corporation Introduces Comprehensive Program",Mar. 13, 1995, Business Wire, http://209.85.173.132/search?q=cache:McscjZC2srEJ:findarticles/mi_m0EIN/is_1995_Marc_ZZZ, WBX231.
"Internet Information Commerce:The First Virtual",Jul. 1995,1st USENIX Wkshp:E-Commerce,NY Retrvd Apr. 5, 2009http://www.usenix.org/publications/library/proceedings/ec95/f_ZZZ,WBX232.
"O'Reilly Releases Website",WebView,EIT,May 12, 1995,V7:Issue41,ISSN1004-042X, Computer underground Digest, RtrvdApr. 5, 2009http://cu-digest.org/CUDS7/cud74_ZZZ,WBX233.
"RSA and EIT Joint Venture", Terisa Systems, EIT and RSA: Secure HTTP, Jun. 13, 1994, Retrieved on Apr. 5, 2009 http://1997.webhistory.org/www.lists/www-talk.1994q2/0980.html,WBX234.
"CommerceNet The First Large-Scale Market Trial",EIT:CommerceNet, Aug. 3, 1994, Proc.5/94, Ties That Bind conference, Rtrvd Apr. 5, 2009 http://internet.eser_ZZZ, WBX235.
Rubin, A.,"IETF-Stockholm meeting" NetCheck:E-signatures,Aug. 5, 1995,pp. 1-2,Cipher,NewsletterIEEE Computer Society's TC 8,http://www.ieee-security.org/Cipher/PastIssu_ZZZ,WBX236.
Open Market, "FastCGI:A High-Performance Web Server Interface", Apr. 96, Retrieved on Apr. 5, 2009 http://www.fastcgi.com/devkit/doc/fastcgi-whitepaper/fastcgi.htm,WBX 237.
Sun Microsystems, "HotJava", Wikipedia, the free encyclopedia, Jun. 1995, Retrieved on Apr. 5, 2009 from http://en.wikipedia.org/wiki/HotJava, WBX238.
W3C Status Codes, HTRESP_html_w3_org, 1992 WBX239.
Hewlett Packard, "HP Odapter/OpenODB", Jul. 1994, Retrieved on Apr. 5, 2009 from http://web.bilkent.edu.tr/Online/oofaq/oo-faq-S-8.13.0.5.html, WBX240.
Internet Shopping Network_ISN Business Newswire (1995) WBX241.
NCR Co-operative Frameworks 3, (1993) WBX242.
Distributed Objects Everywhere, NEO, Wikipedia (1996) WBX243.
NetMarket (1996) WBX244.
Enterprise Object Netorks, Wikipedia (1996) WBX245.
OMG Document No. 91_12_1 Revision 1_1 (1997) WBX246.
DigiCash Smartcards (1997) WBX247.
IBM System Object Model_SOM (1998) WBX248.
IBM System Object Model_SOM,DSOM (1998) WBX249.
Open Market StoreBuilder (1995) WBX250.
WebXpress Web StoreFront (1996) WBX251.
PNC, Industry.Net do eCommerce (1996) WBX252.
10KPowerShip,PowerPartner (1996) WBX253.
T. Berners Lee Hypertext Mark up Language RFC1866(1995) WBX 254.
E. Nebel RFC1867 (1995) WEBX255.
RFC1942 (1996) WEBX256.
J. Seidman RFC1980 (1996) WBX257.
HTML—Wikipedia, the free encyclopedia—Notepad (1998) WBX258.
Berners-Lee, T., RFC 1630, "Universal Resource Identifiers in WWW", Network Working Group, CERN, Jun. 1994 WBX259.
Object Broker Service Middleware Sourcebook (1995) WBX260.
WBXexecsummary4809new2bizplan[1] (2009) WBX268.
Kramer, Douglas Java Whitepaper May 1996, WBX500.
Birrell A. et al., "Network Objects", SRC Research Report, Feb. 28, 1994, WBX014.
Edwards, N., Object Wrapping (for WWW)—The Key to Integrated Services, ANSA Phase III, Apr. 25, 1995, WBX058.
Ehikioya,S.A.,"An Agent-Based System for Distributed Transactions: a Model for Internet-Based transactions",Elec and Computer Engg IEEE Canadian Conf,V1,May 9, 1999,p. 289-294,WBX059.
Microsoft DJ Order, C-08-05149 WHA "Order Granting Defendant's Motion to Dismiss", Federal Court of Northern California, Feb. 17, 2009, WBX060.
"Portal Solutions, an Open Market eBusiness Solution Brief". White Paper. Open Market, Forrester Research TechRankings, Feb. 2001, WBX061.

"Wireless Solutions, An Open Market eBusiness Solution Brief", WhitePaper.Open Market, Forrester Research TechRankings, Feb. 2001, WBX062.

Fraga, J. et al., "A Programming Model for Real-Time Applications in Open Distributed Systems", IEEE, 1995, pp. 104-111, WBX063.

Birrell A. et al., "Implementing Remote Procedure Calls", Xerox Palo Alto Research Center, ACM Transactions, Feb. 1, 1994, WBX015.

Bowen, C. et al., "How to Get the Most out of CompuServe" 5th Ed. 1991, Random House, Inc. 1991, WBX016.

Braden, R. et al., RFC 1122: "Requirements for Internet Hosts—Communication Layers" Oct. 1, 1989, WBX017.

Radia, S. R. et al., "The Spring Object Model", Proceedings of the USENIX Conference on Object-Oriented Technologies, Monterey, CA, Jun. 1995, WBX124.

Rosenberry, et al., "OSF Distributed Computing Environment—Understanding DCE"—O'Reilly & Associates, Jun. 1993, WBX126.

Rubin, C. "Wired: In the Bag", Jun. 1997, WBX127.

Schepp et al., "The Complete Guide to CompuServe: Chapter 12: Travel Services: See the World Today the Compuserve Way", 1990, pp. 409-437, McGraw Hill, WBX128.

Schmidt, D. et al.,"Object-Oriented Components for High-Speed Network Programming", Prcdgs of USENIX Conference on Object-Oriented Technologies, Monterey,CA, Jun. 1995, WBX 129.

Siegel, J., "Common Object Services Specification vol. 1, Rev 1, First Edition", OMG Doc 94-1-1, Mar. 1, 1994, WBX130A.

"Common Desktop Environment: Product Glossary", SunSoft, 1994-1995, WBX131.

"Common Desktop Environment: Applications Builder User's Guide", SunSoft, 1994-1995, WBX132.

"OpenStep Development Tools", SunSoft, 1996, WBX133A, 133B.

Porting NextStep 3.2/3.3 Applications to OpenStep on Solaris, Sunsoft, 1996, WBX134.

* cited by examiner

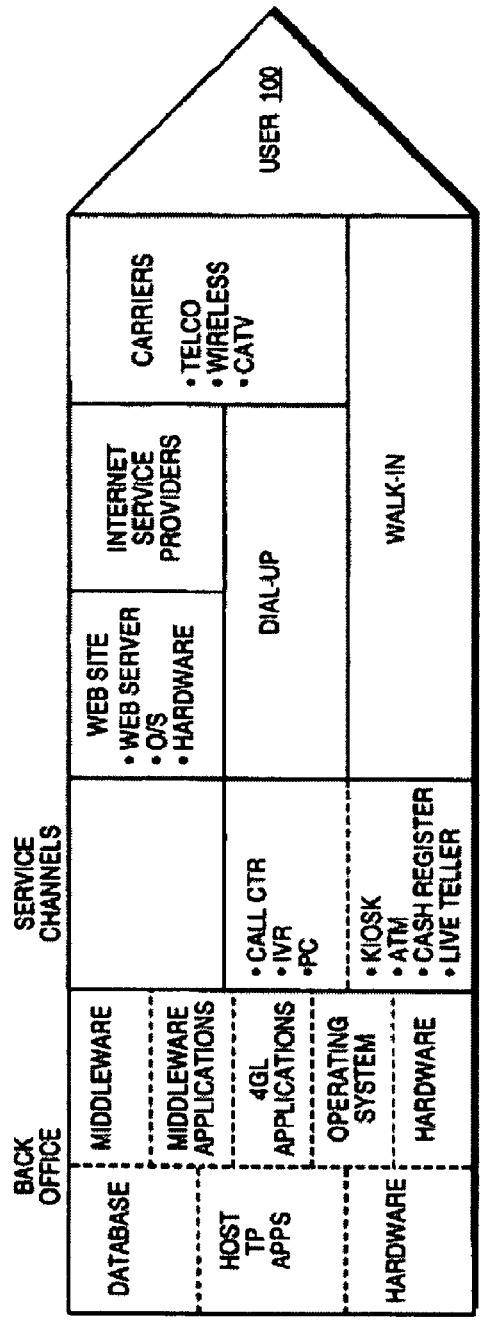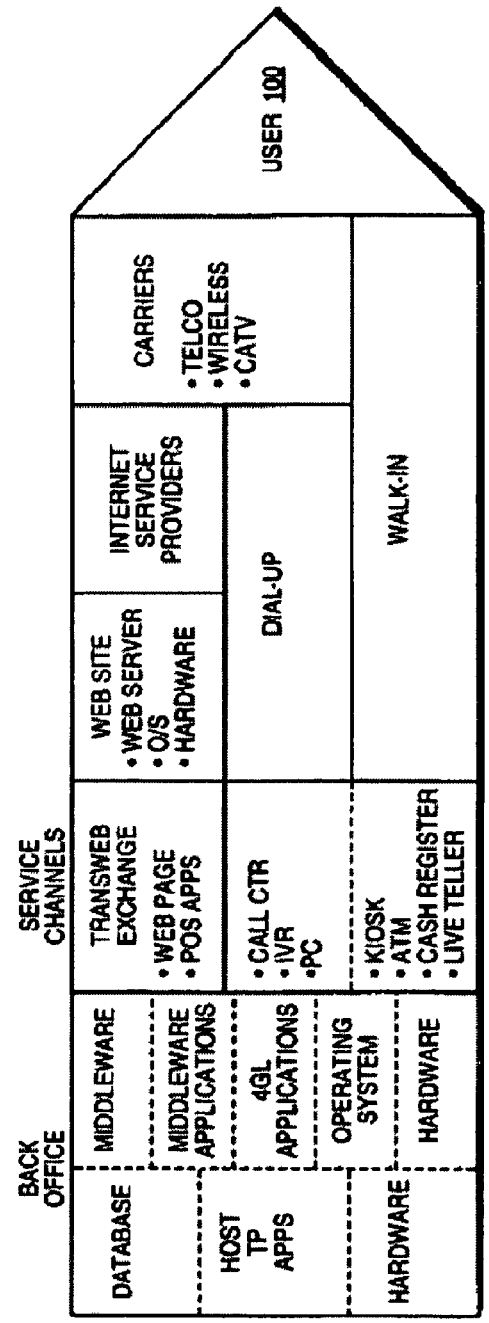

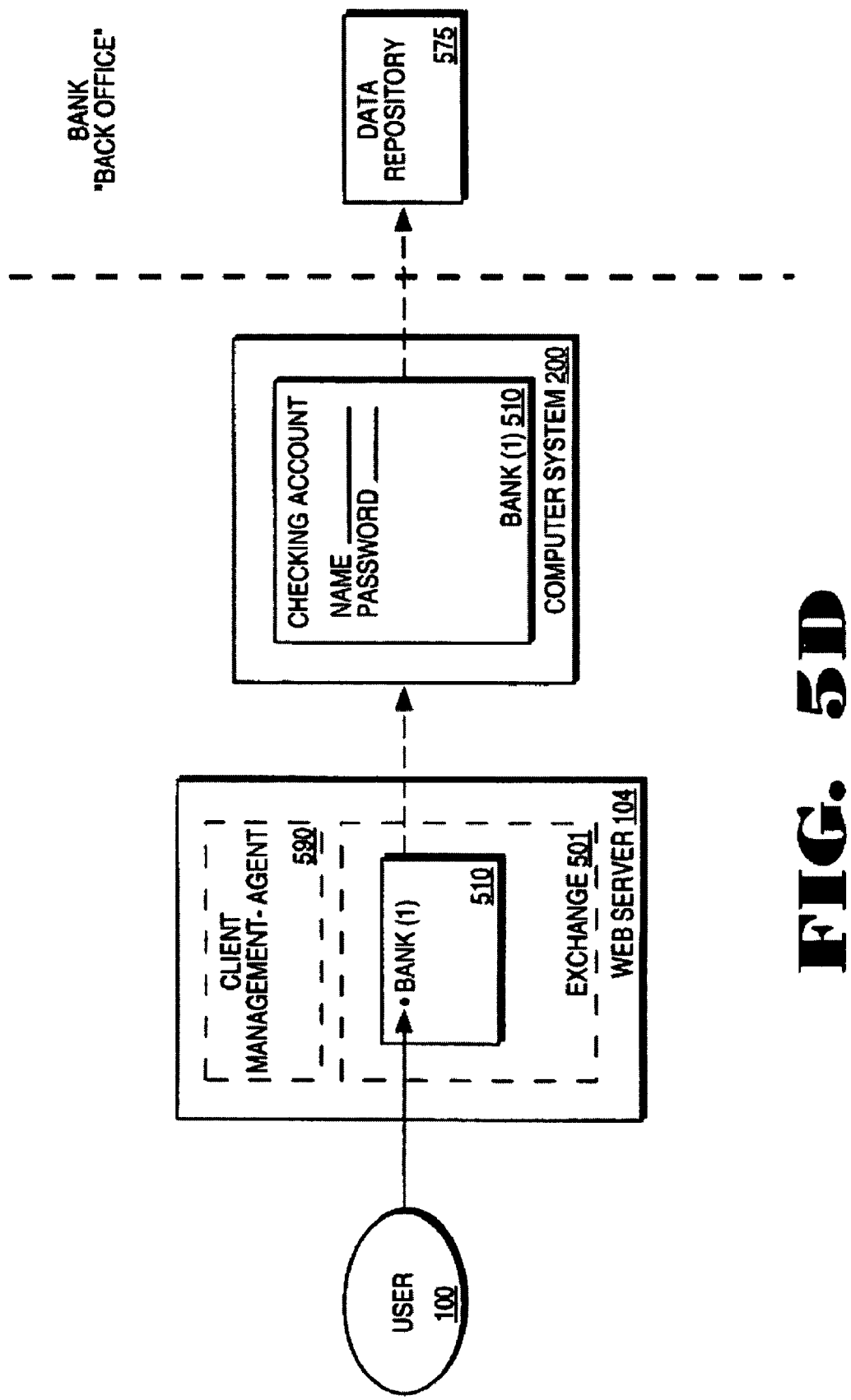

REAL-TIME WEB TRANSACTIONS FROM WEB APPLICATIONS

CROSS-REFERENCE TO RELATED APPLICATIONS

This application is a divisional and claims the priority benefit of U.S. patent application Ser. No. 11/980,185 filed Oct. 30, 2007 now U.S. Pat. No. 8,037,158, which is a continuation-in-part of Ser. No. 09/792,323, now U.S. Pat. No. 7,340,506, filed Feb. 23, 2001, which is a divisional of U.S. patent application Ser. No. 09/296,207, filed Apr. 21, 1999 now U.S. Patent No. 6,212,556, which is a continuation-in-part of U.S. patent application Ser. No. 08/879,958, now U.S. Pat. No. 5,987,500, filed Jun. 20, 1997, which is a divisional and claims the priority benefit of U.S. patent application Ser. No. 08/700,726, now U.S. Pat. No. 5,778,178, filed Aug. 5, 1996, which claims the priority benefit of U.S. provisional application 60/006,634 filed Nov. 13, 1995, as does the subject application. This application also claims the benefit under 35 U.S.C. 119(e) to U.S. Provisional application Ser. No. 60/006,634 filed on Nov. 13,1995. Related are also application Ser. Nos. 09/863,704, now U.S. Pat. No. 7,930,340; 12/628,060; 12/628,068; 12/628,069, 12/932,758 and 60/206,422.

BACKGROUND

1. Field of the Invention

The present invention relates to the area of Internet communications. Specifically, the present invention relates to a method and apparatus for configurable value-added network switching and object routing.

2. Background of the Invention

With the Internet and the World Wide Web ("the Web") evolving rapidly as a viable consumer medium for electronic commerce, new on-line services are emerging to fill the needs of on-line users. An Internet user today can browse on the Web via the use of a Web browser. Web browsers are software interfaces that run on Web clients to allow access to Web servers via a simple user interface. A Web user's capabilities today from a Web browser are, however, extremely limited. The user can perform one-way, browse-only interactions. Additionally, the user has limited "deferred" transactional capabilities, namely electronic mail (e-mail) capabilities. E-mail capabilities are referred to as "deferred transactions" because the consumer's request is not processed until the e-mail is received, read, and the person or system reading the e-mail executes the transaction. This transaction is thus not performed in real-time.

FIG. 1A illustrates typical user interactions on the Web today. User 100 sends out a request from Web browser 102 in the form of a universal resource locator (URL) 101 in the following manner: http://www.car.com. URL 101 is processed by Web browser 102 that determines the URL corresponds to car dealer Web page 105, on car dealer Web server 104. Web browser 102 then establishes browse link 103 to car dealer Web page 105. User 100 can browse Web page 105 and select "hot links" to jump to other locations in Web page 105, or to move to other Web pages on the Web. This interaction is typically a browse-only interaction. Under limited circumstances, the user may be able to fill out a form on car dealer Web page 105, and e-mail the form to car dealer Web server 104. This interaction is still strictly a one-way browse mode communications link, with the e-mail providing limited, deferred transactional capabilities.

Under limited circumstances, a user may have access to two-way services on the Web via Common Gateway Interface (CGI) applications. CGI is a standard interface for running external programs on a Web server. It allows Web servers to create documents dynamically when the server receives a request from the Web browser. When the Web server receives a request for a document, the Web server dynamically executes the appropriate CGI script and transmits the output of the execution back to the requesting Web browser. This interaction can thus be termed a "two-way" transaction. It is a severely limited transaction, however, because each CGI application is customized for a particular type of application or service.

For example, as illustrated in FIG. 1B, user 100 may access bank 150's Web server and attempt to perform transactions on checking account 152 and to make a payment on loan account 154. In order for user 100 to access checking account 152 and loan account 154 on the Web, CGI application scripts must be created for each account, as illustrated in FIG. 1B. The bank thus has to create individual scripts for each of its services to offer users access to these services. User 100 can then interact in a limited fashion with these individual applications. Creating and managing individual CGI scripts for each service is not a viable solution for merchants with a large number of services.

As the Web expands and electronic commerce becomes more desirable, the need increases for robust, real-time, bi-directional transactional capabilities on the Web. A true real-time, bi-directional transaction would allow a user to connect to a variety of services on the Web, and perform real-time transactions on those services. For example, although user 100 can browse car dealer Web page 105 today, the user cannot purchase the car, negotiate a car loan or perform other types of real-time, two-way transactions that he can perform with a live salesperson at the car dealership. Ideally, user 100 in FIG. 1A would be able to access car dealer Web page 105, select specific transactions that he desires to perform, such as purchase a car, and perform the purchase in real-time, with two-way interaction capabilities. CGI applications provide user 100 with a limited ability for two-way interaction with car dealer Web page 105, but due to the lack of interaction and management between the car dealer and the bank, he will not be able to obtain a loan and complete the purchase of the car via a CGI application. The ability to complete robust real-time, two-way transactions is thus not truly available on the Web today.

SUMMARY OF THE INVENTION

It is therefore an object of the present invention to provide a method and apparatus for providing real-time, two-way transactional capabilities on the Web. Specifically, one embodiment of the present invention discloses a configurable value-added network switch for enabling real-time transactions on the World Wide Web. The configurable value added network switch comprises means for switching to a transactional application in response to a user specification from a World Wide Web application, means for transmitting a transaction request from the transactional application, and means for processing the transaction request.

According to another aspect of the present invention, a method and apparatus for enabling object routing on the World Wide Web is disclosed. The method for enabling object routing comprises the steps of creating a virtual information store containing information entries and attributes, associating each of the information entries and the attributes with an object identity, and assigning a unique network address to each of the object identities.

Other objects, features and advantages of the present invention will be apparent from the accompanying drawings and from the detailed description.

BRIEF DESCRIPTION OF THE DRAWINGS

The features and advantages of the present invention will be apparent from the accompanying drawings and from the detailed description of the present invention as set forth below.

FIG. 4A illustrates conceptually the user value chain as it exists today.

FIG. 4B illustrates one embodiment of the present invention.

FIG. 5D illustrates a user selecting a bank POSvc application from the POSvc application list.

DETAILED DESCRIPTION

The present invention relates to a method and apparatus for configurable value-added network switching and object routing and management. "Web browser" as used in the context of the present specification includes conventional Web browsers such as NCSA Mosaic™ from NCSA and Netscape Mosaic™ from Netscape™. The present invention is independent of the Web browser being utilized and the user can use any Web browser, without modifications to the Web browser. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1A:
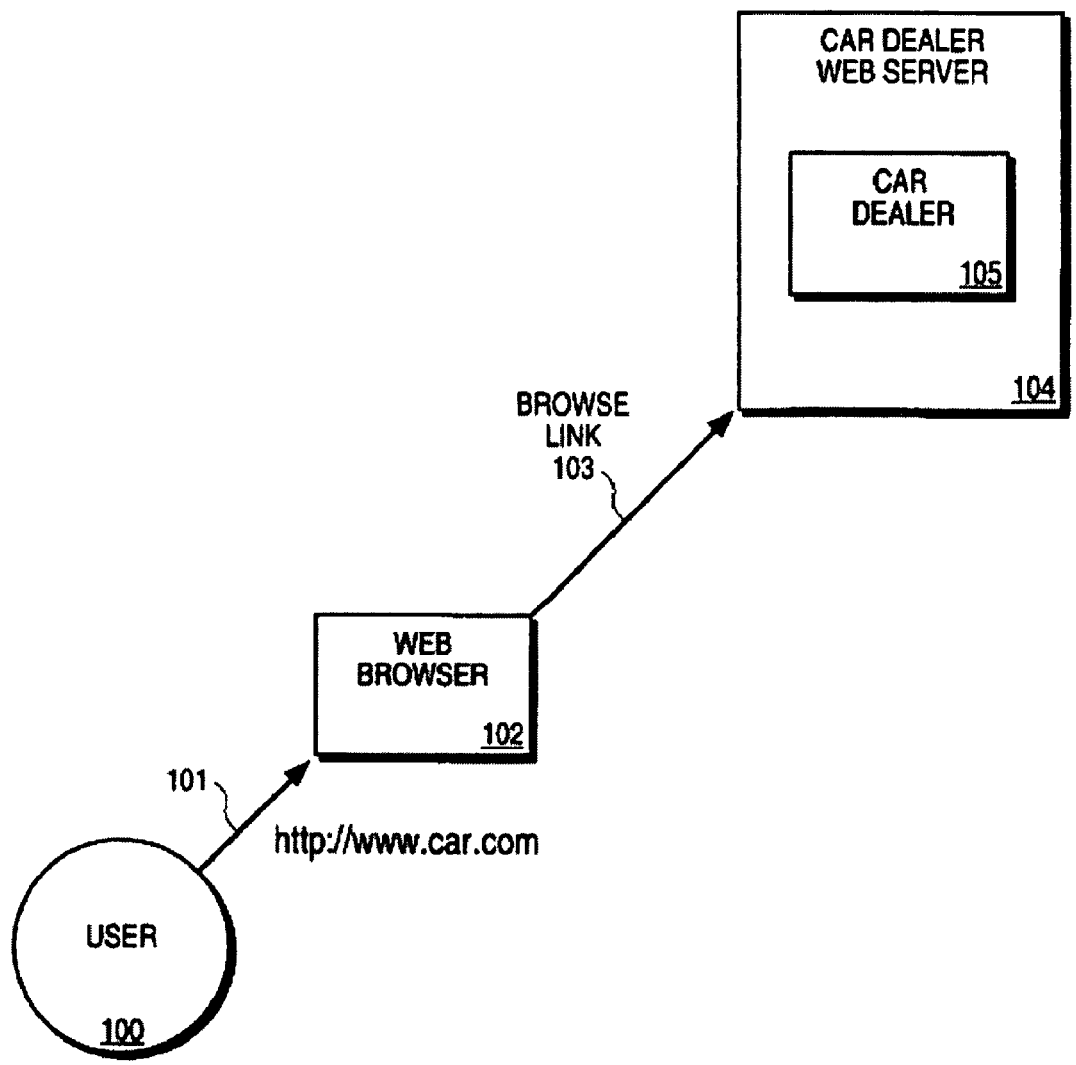
FIG. 1A is an illustration of a current user's browse capabilities on the Web via a Web browser.
Figure 1B:
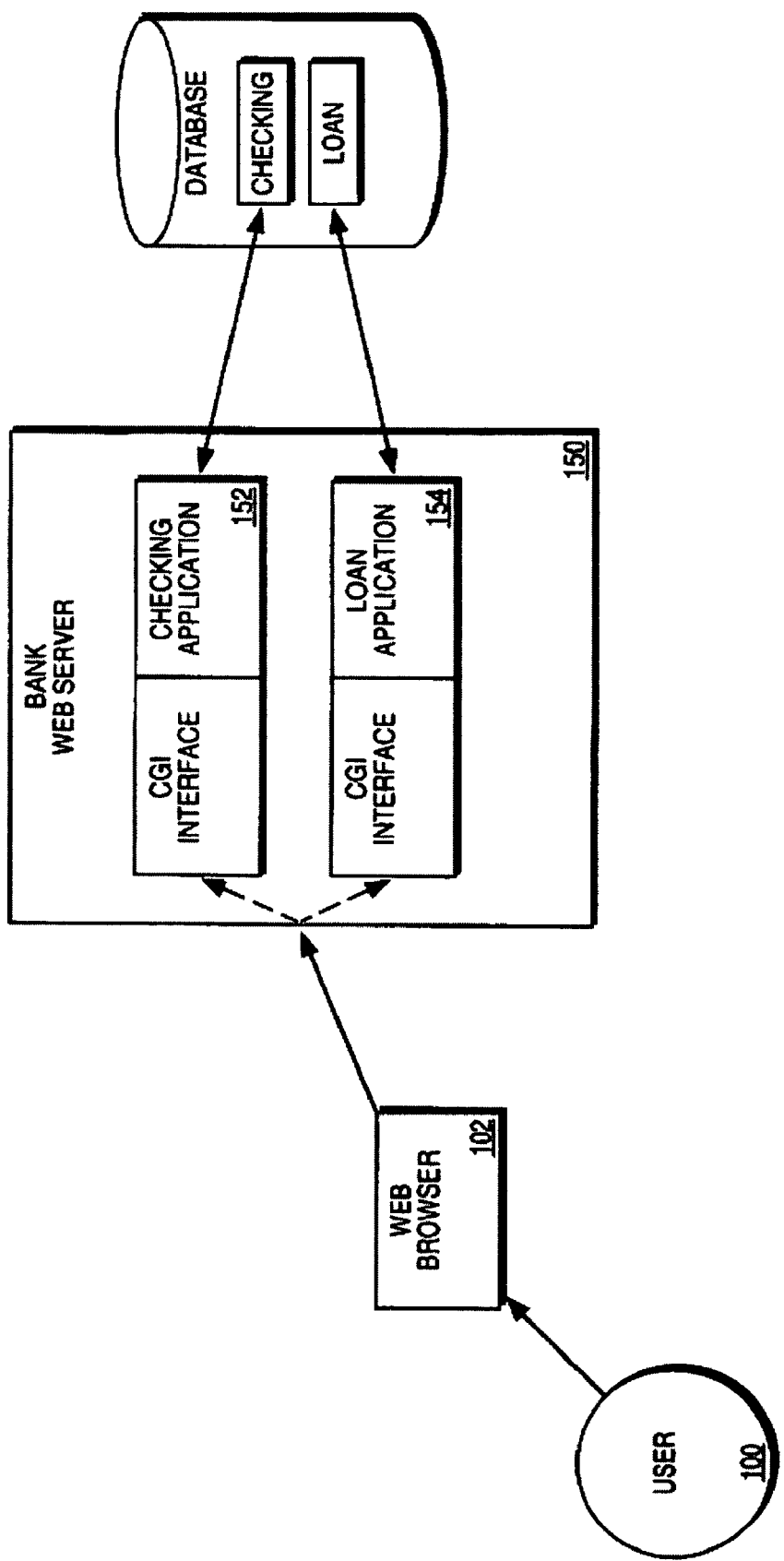
FIG. 1B is an illustration of a current user's capabilities to perform limited transactions on the Web via CGI applications.
Figure 2:
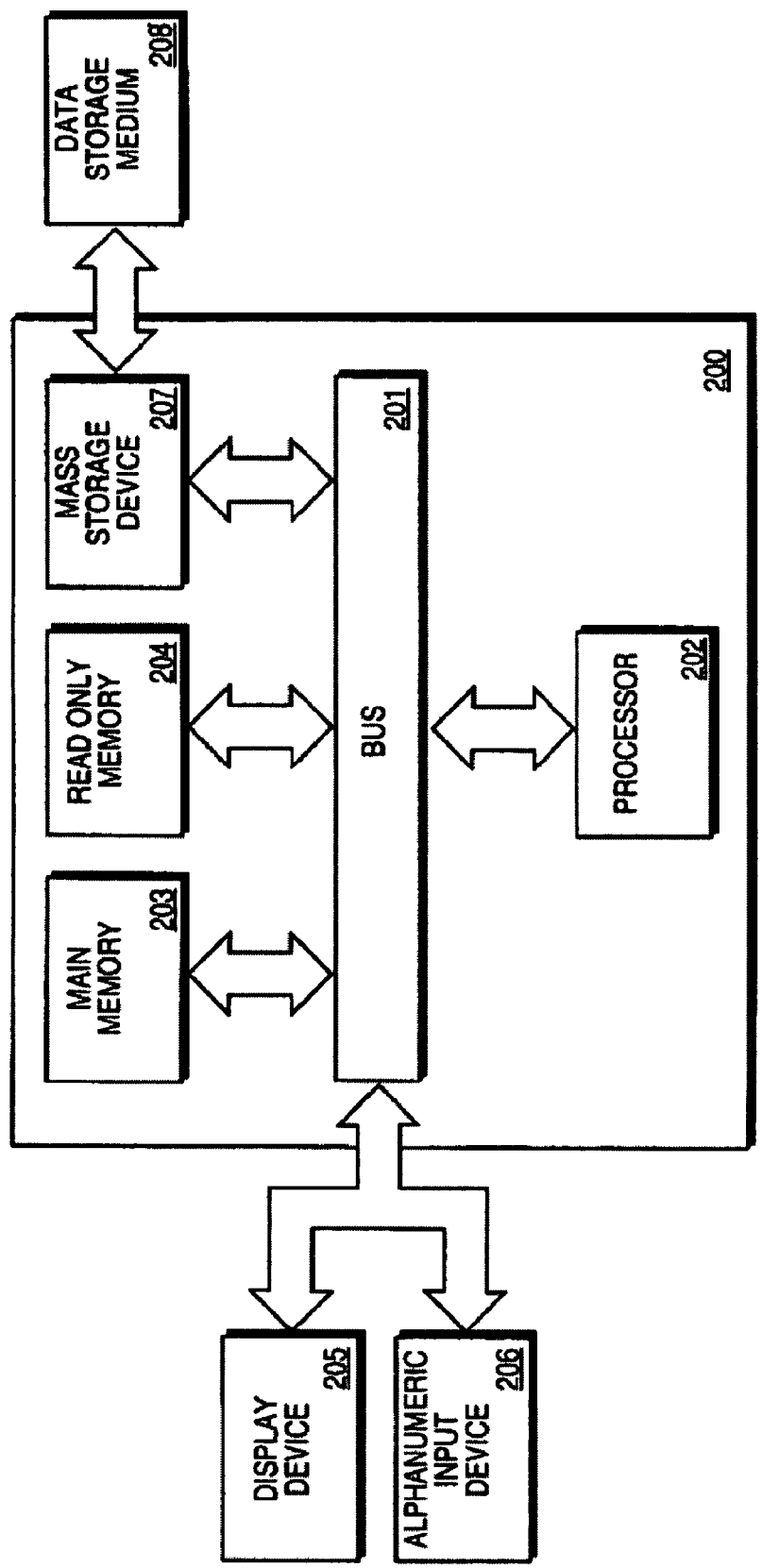
FIG. 2 illustrates a typical computer system on which the present invention may be utilized.

FIG. 2 illustrates a typical computer system 200 in which the present invention operates. The preferred embodiment of the present invention is implemented on an IBM™ Personal Computer manufactured by IBM Corporation of Armonk, N.Y. Alternate embodiments may be implemented on a Macintosh™ computer manufactured by Apple™ Computer, Incorporated of Cupertino, Calif. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium™ microprocessor manufactured by Intel™ Corporation or the Motorola™ 68040 or Power PC™ brand microprocessor manufactured by manufactured by Motorola™ Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 3:
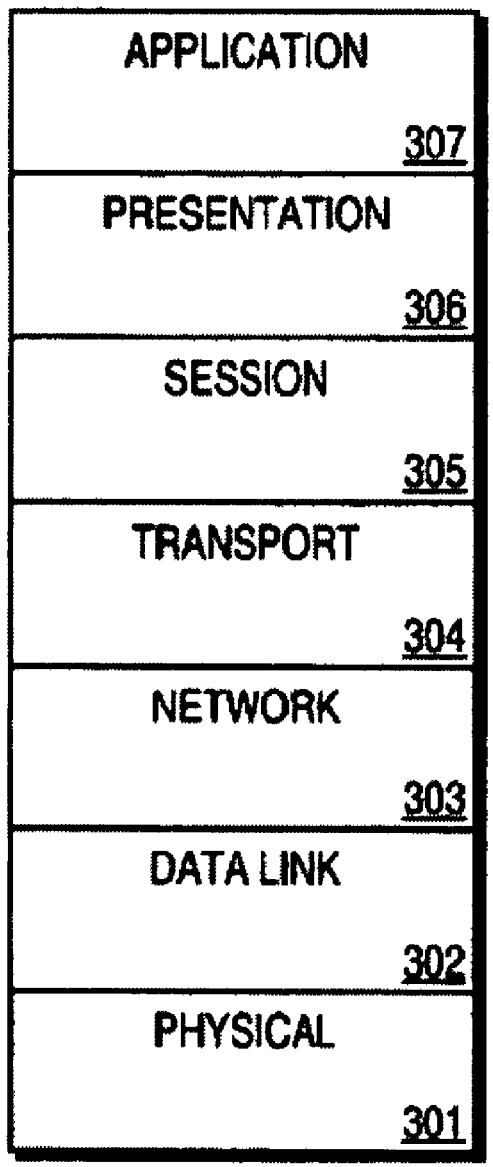
FIG. 3 illustrates the Open Systems Interconnection (OSI) Model.

FIG. 3 illustrates the Open Systems Interconnection (OSI) reference model. OSI Model 300 is an international standard that provides a common basis for the coordination of standards development, for the purpose of systems interconnection. The present invention is implemented to function as a routing switch within the "application layer" of the OSI model. The model defines seven layers, with each layer communicating with its peer layer in another node through the use of a protocol. Physical layer 301 is the lowest layer, with responsibility to transmit unstructured bits across a link. Data link layer 302 is the next layer above physical layer 301. Data link layer 302 transmits chunks across the link and deals with problems like checksumming to detect data corruption, orderly coordination of the use of shared media and addressing when multiple systems are reachable. Network bridges operate within data link layer 302.

Network layer 303 enables any pair of systems in the network to communicate with each other. Network layer 303 contains hardware units such as routers that handle routing, packet fragmentation and reassembly of packets. Transport layer 304 establishes a reliable communication stream between a pair of systems, dealing with errors such as lost packets, duplicate packets, packet reordering and fragmentation. Session layer 305 offers services above the simple communication stream provided by transport layer 304. These services include dialog control and chaining. Presentation layer 306 provides a means by which OSI compliant applications can agree on representations for data. Finally, application layer 307 includes services such as file transfer, access and management services (FTAM), electronic mail and virtual terminal (VT) services. Application layer 307 provides a means for application programs to access the OSI environment. As described above, the present invention is implemented to function as a routing switch in application layer 307. Application layer routing creates an open channel for the management, and the selective flow of data from remote databases on a network.

A. Overview

FIG. 4A illustrates conceptually the user value chain as it exists today. The user value chain in FIG. 4A depicts the types of transactions that are performed today, and the channels through which the transactions are performed. A "transaction" for the purposes of the present invention includes any type of commercial or other type of interaction that a user may want to perform. Examples of transactions include a deposit into a bank account, a request for a loan from a bank, a purchase of a car from a car dealership or a purchase of a car with financing from a bank. A large variety of other transactions are also possible.

A typical user transaction today may involve user 100 walking into a bank or driving up to a teller machine, and interacting with a live bank teller, or automated teller machine (ATM) software applications. Alternatively, user 100 can perform the same transaction by using a personal computer (PC), activating application software on his PC to access his bank account, and dialing into the bank via a modem line. If user 100 is a Web user, however, there is no current mechanism for performing a robust, real-time transaction with the bank, as illustrated in FIG. 4A. CGI scripts provide only limited two-way capabilities, as described above. Thus, due to this lack of a robust mechanism by which real-time Web transactions can be performed, the bank is unable to be a true "Web merchant," namely a merchant capable of providing complete transactional services on the Web.

According to one embodiment of the present invention, as illustrated in FIG. 4B, each merchant that desires to be a Web merchant can provide real-time transactional capabilities to users who desire to access the merchants' services via the Web. This embodiment includes a service network running on top of a facilities network, namely the Internet, the Web or e-mail networks. For the purposes of this application, users are described as utilizing PC's to access the Web via Web server "switching" sites. (Switching is described in more detail below). Users may also utilize other personal devices such as network computers or cellular devices to access the merchants' services via appropriate switching sites. These switching sites include non-Web network computer sites and cellular provider sites. Five components interact to provide this service network functionality, namely an exchange, an operator agent, a management agent, a management manager and a graphical user interface. All five components are described in more detail below.

Figure 5A:
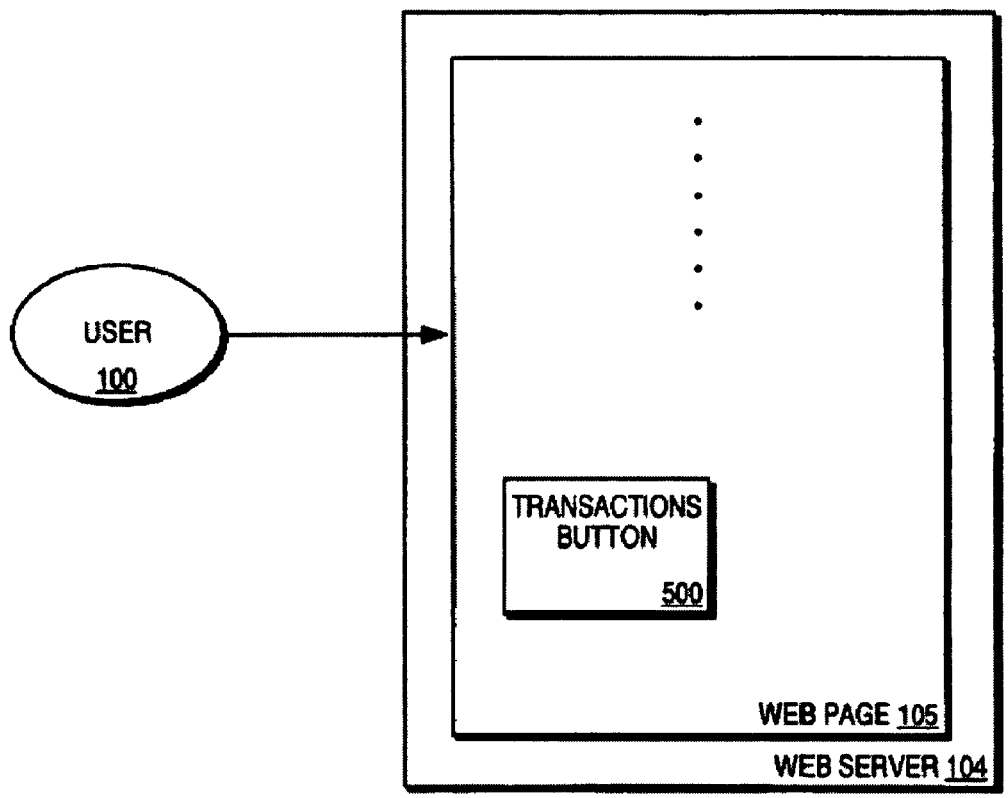
FIG. 5A illustrates a user accessing a Web server including one embodiment of the present invention.

As illustrated in FIG. 5A, user 100 accesses Web server 104. Having accessed Web server 104, user 100 can decide that he desires to perform real-time transactions. When Web server 104 receives user 100's indication that he desires to perform real-time transactions, the request is handed over to an exchange component. Thus, from Web page 105, for example, user 100 can select button 500, entitled "Transactions" and Web server 104 hands user 100's request over to the exchange component. The button and the title can be replaced by any mechanism that can instruct a Web server to hand over the consumer's request to the exchange component.

Figure 5B:
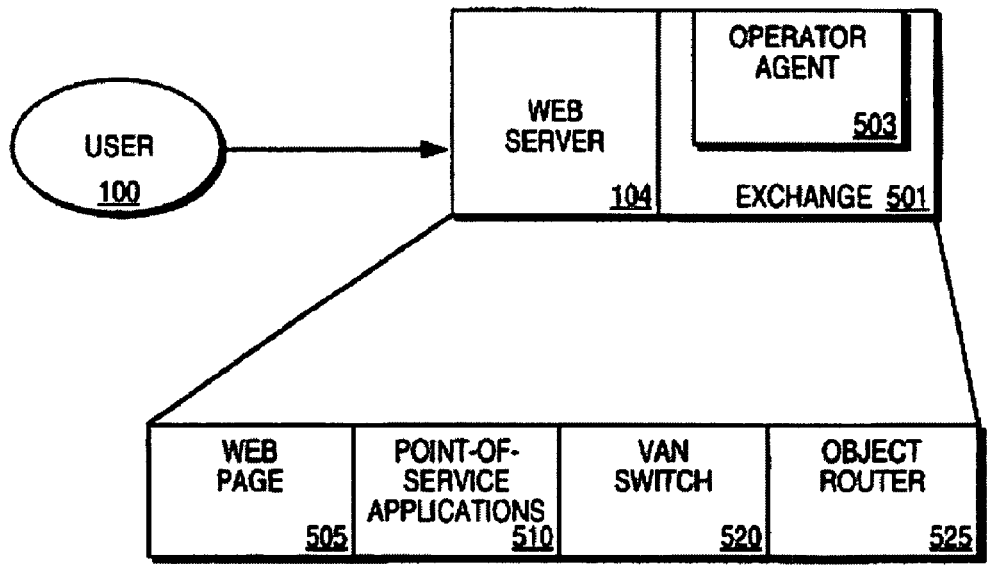
FIG. 5B illustrates the exchange component according to one embodiment of the present invention.

FIG. 5B illustrates exchange 501. Exchange 501 comprises Web page 505 and point-of-service (POSvc) applications 510. Exchange 501 also conceptually includes a switching component and an object routing component (described in more detail below). POSvc applications 510 are transactional applications, namely applications that are designed to incorporate and take advantage of the capabilities provided by the present invention. Although exchange 501 is depicted as residing on Web server 104, the exchange can also reside on a separate computer system that resides on the Internet and has an Internet address. Exchange 501 may also include operator agent 503 that interacts with a management manager (described in more detail below). Exchange 501 creates and allows for the management (or distributed control) of a service network, operating within the boundaries of an IP-based facilities network. Thus, exchange 501 and a management agent component, described in more detail below, under the headings "VAN Switch and Object Routing," together perform the switching, object routing, application and service management functions according to one embodiment of the present invention.

Exchange 501 processes the consumer's request and displays an exchange Web page 505 that includes a list of POSvc applications 510 accessible by exchange 501. A POSvc application is an application that can execute the type of transaction that the user may be interested in performing. The POSvc list is displayed via the graphical user interface component. One embodiment of the present invention supports Hyper-Text Markup Language as the graphical user interface component. Virtual Reality Markup Language and Java™ are also supported by this embodiment. A variety of other graphical user interface standards can also be utilized to implement the graphical user interface.

Figure 5C:
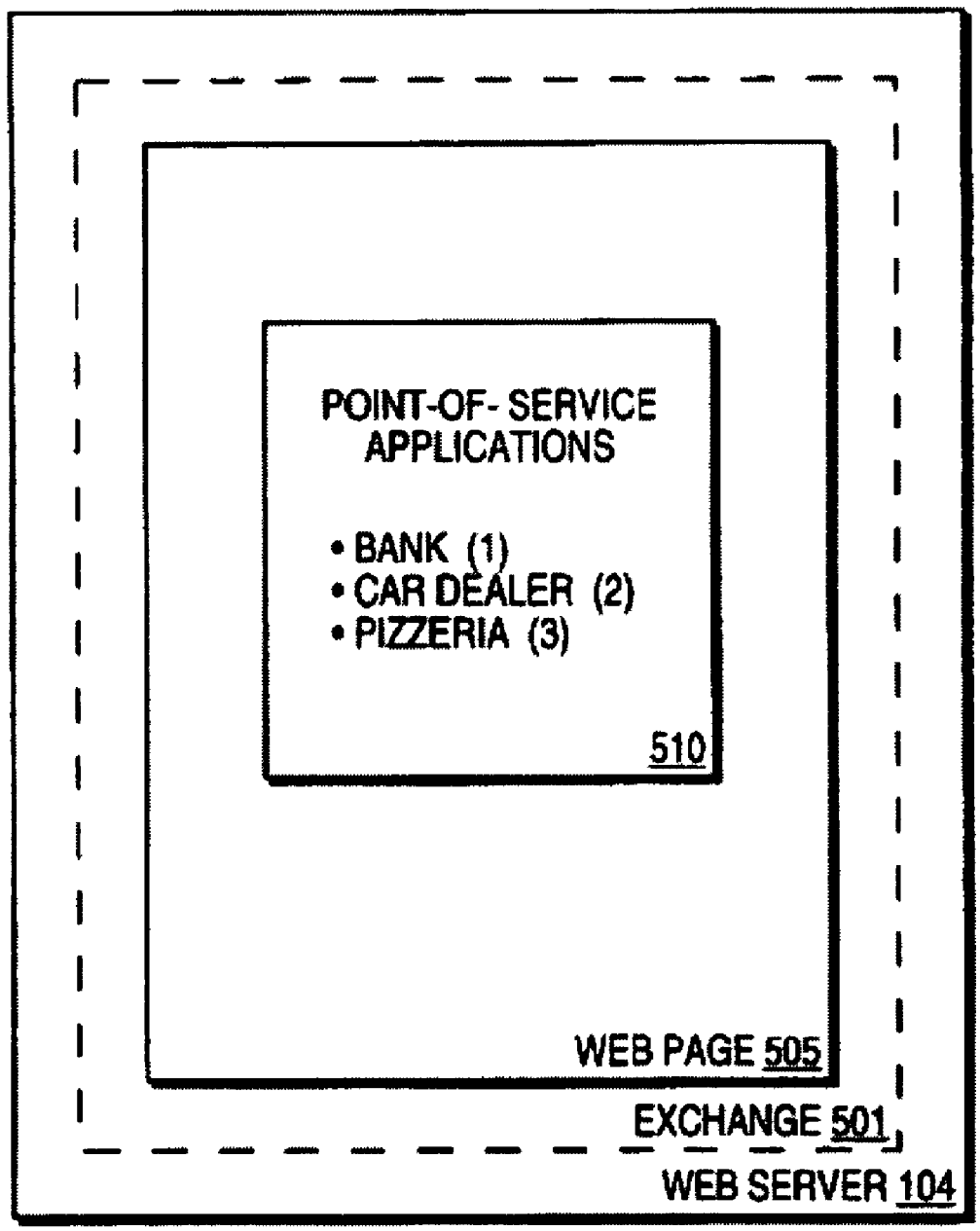
FIG. 5C illustrates an example of a point-of-service (POSvc) application list.

An example of a POSvc application list is illustrated in FIG. 5C. User 100 can thus select from POSvc applications Bank 510(1), Car Dealer 510(2) or Pizzeria 510(3). Numerous other POSvc applications can also be included in this selection. If user 100 desires to perform a number of banking transactions, and selects the Bank application, a Bank POSvc application will be activated and presented to user 100, as illustrated in FIG. 5D. For the purposes of illustration, exchange 501 in FIG. 5D is shown as running on a different computer system (Web server 104) from the computer systems of the Web merchants running POSvc applications (computer system 200). Exchange 501 may, however, also be on the same computer system as one or more of the computer systems of the Web merchants.

Once Bank POSvc application 510 has been activated, user 100 will be able to connect to Bank services and utilize the application to perform banking transactions, thus accessing data from a host or data repository 575 in the Bank "Back Office." The Bank Back Office comprises legacy databases and other data repositories that are utilized by the Bank to store its data. This connection between user 100 and Bank services is managed by exchange 501. As illustrated in FIG. 5D, once the connection is made between Bank POSvc application 510(1), for example, and Bank services, an operator agent on Web server 104 may be activated to ensure the availability of distributed functions and capabilities.

Each Web merchant may choose the types of services that it would like to offer its clients. In this example, if Bank decided to include in their POSvc application access to checking and savings accounts, user 100 will be able to perform real-time transactions against his checking and savings accounts. Thus, if user 100 moves $500 from his checking account into his savings account, the transaction will be performed in real-time, in the same manner the transaction would have been performed by a live teller at the bank or an ATM machine. Therefore, unlike his prior access to his account, user 100 now has the capability to do more than browse his bank account. The ability to perform these types of robust, real-time transactions from a Web client is a significant aspect of the present invention.

Figure 5E:
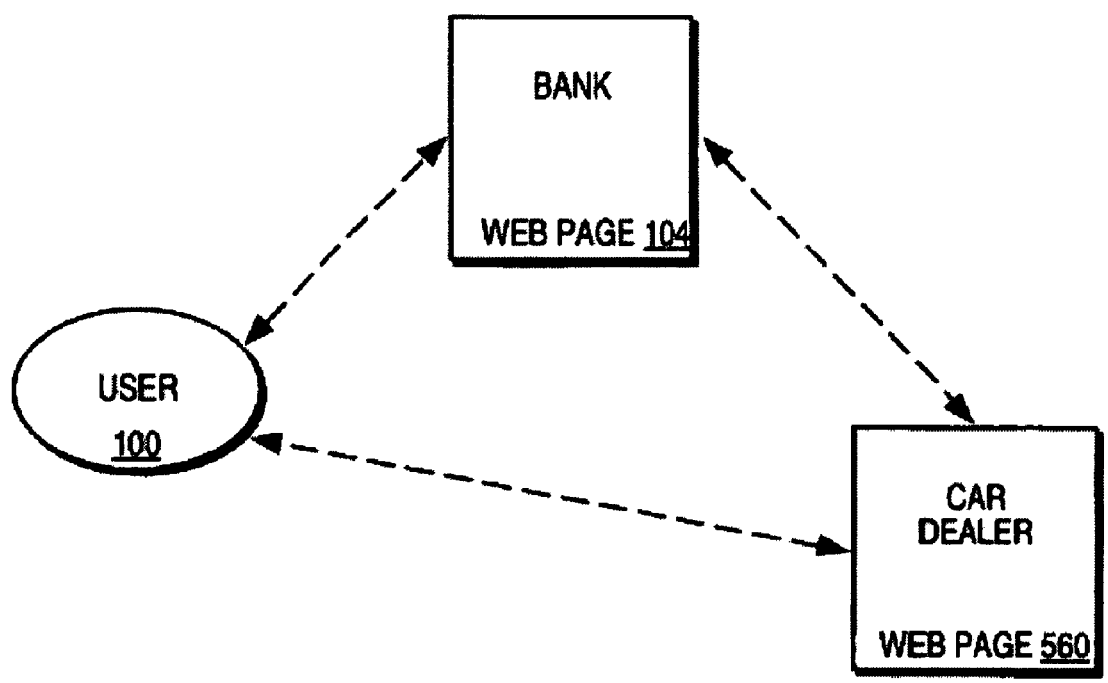
FIG. 5E illustrates a three-way transaction according to one embodiment of the present invention.

Bank can also decide to provide other types of services in POSvc application 510(1). For example, Bank may agree with Car dealership to allow Bank customers to purchase a car from that dealer, request a car loan from Bank, and have the entire transaction performed on the Web, as illustrated in FIG. 5E. In this instance, the transactions are not merely two-way, between the user and Bank, but three-way, amongst the consumer, Bank and Car dealership. According to one aspect of the present invention, this three-way transaction can be expanded to n-way transactions, where n represents a predetermined number of merchants or other service providers who have agreed to cooperate to provide services to users. The present invention therefore allows for "any-to-any" communication and transactions on the Web, thus facilitating a large, flexible variety of robust, real-time transactions on the Web.

Finally, Bank may also decide to provide intra-merchant or intra-bank services, together with the inter-merchant services described above. For example, if Bank creates a POSvc application for use by the Bank Payroll department, Bank may provide its own employees with a means for submitting timecards for payroll processing by the Bank's Human Resources (HR) Department. An employee selects the Bank HR POSvc application, and submits his timecard. The employee's timecard is processed by accessing the employee's payroll information, stored in the Bank's Back Office. The transaction is thus processed in real-time, and the employee receives his paycheck immediately.

B. Van Switching and Object Routing

Figure 6A:
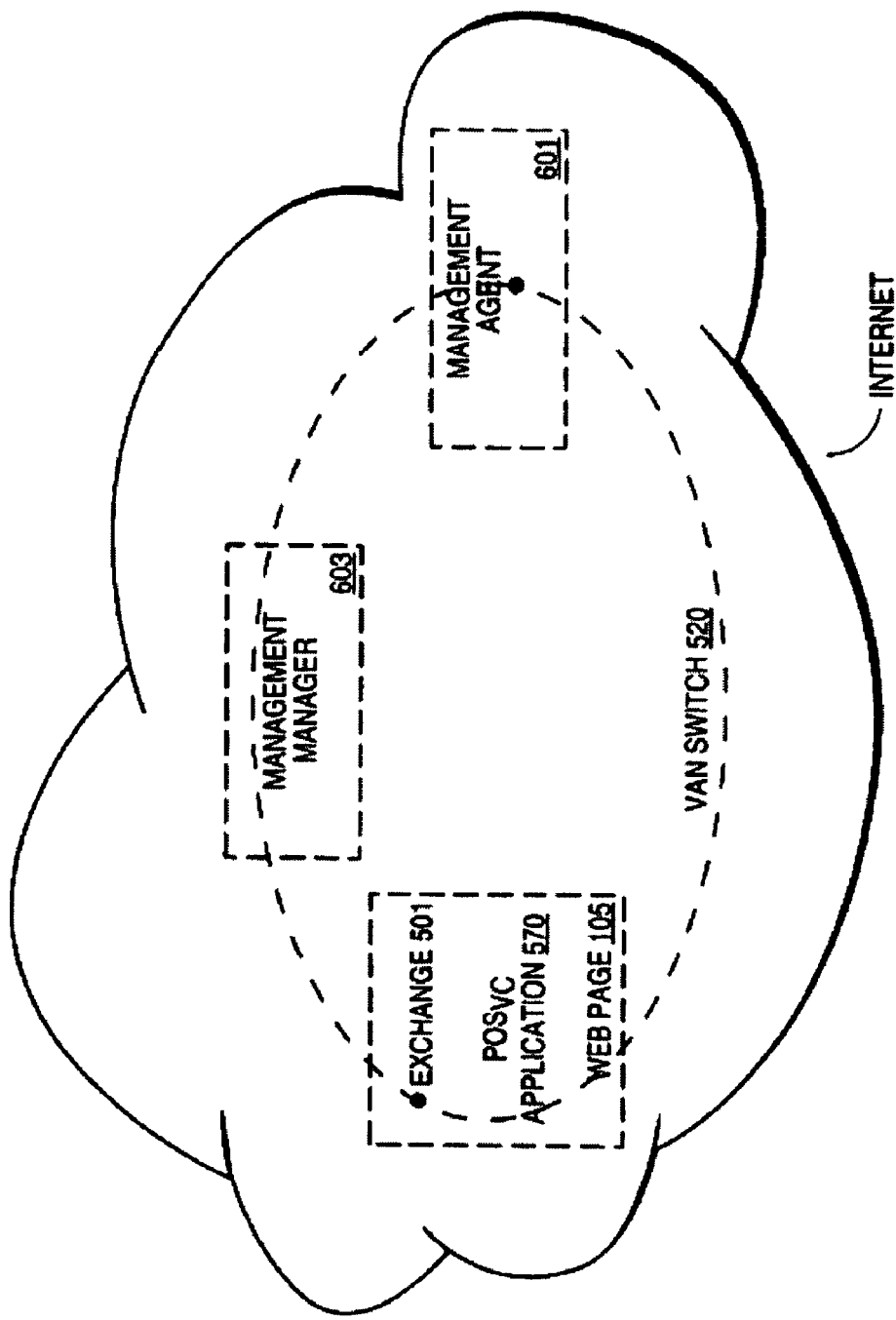
FIG. 6A illustrates a value-added network (VAN) switch.

As described above, exchange 501 and management agent 601, illustrated in FIG. 6A, together constitute a value-added network (VAN) switch. These two elements may take on different roles as necessary, including peer-to-peer, client-server or master-slave roles. Management manager 603 is illustrated as residing on a separate computer system on the Internet. Management manager 603 can, however, also reside on the same machine as exchange 501. Management manager 603 interacts with the operator agent 503 residing on exchange 501.

VAN switch 520 provides multi-protocol object routing, depending upon the specific VAN services chosen. This multi-protocol object routing is provided via a proprietary protocol, TransWeb™ Management Protocol (TMP). TMP incorporates the same security features as the traditional Simple Network Management Protocol, SNMP. It also allows for the integration of other traditional security mechanisms, including RSA security mechanisms.

One embodiment of the present invention utilizes TMP and distributed on-line service information bases (DOLSIBs) to perform object routing. Alternatively, TMP can incorporate s-HTTP, Java™, the WinSock API or ORB with DOLSIBs to perform object routing. DOLSIBs are virtual information stores optimized for networking. All information entries and attributes in a DOLSIB virtual information store are associated with a networked object identity. The networked object identity identifies the information entries and attributes in the DOLSIB as individual networked objects, and each networked object is assigned an Internet address. The Internet address is assigned based on the IP address of the node at which the networked object resides.

Figure 6B:
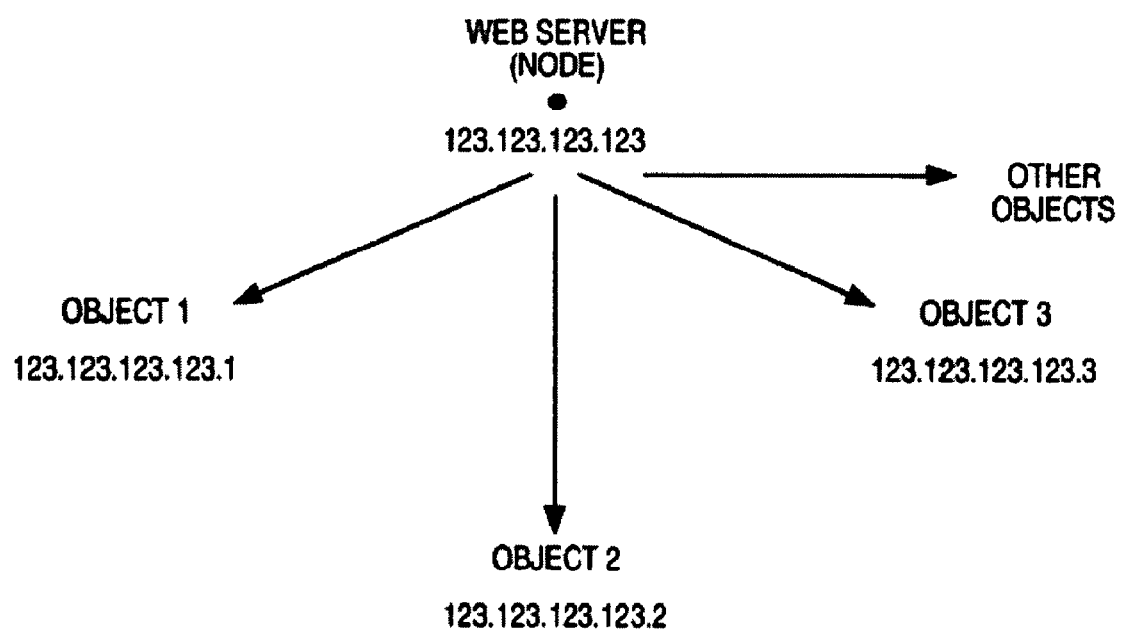
FIG. 6B illustrates the hierarchical addressing tree structure of the networked objects in DOLSIBs.

For example, in FIG. 5A, Web server 104 is a node on the Internet, with an IP address. All networked object associated with Web server 104 will therefore be assigned an Internet address based on the Web server 104's IP address. These networked objects thus "branch" from the node, creating a hierarchical tree structure. The Internet address for each networked object in the tree essentially establishes the individual object as an "IP-reachable" or accessible node on the Internet. TMP utilizes this Internet address to uniquely identify and access the object from the DOLSIB. FIG. 6B illustrates an example of this hierarchical addressing tree structure.

Each object in the DOLSIB has a name, a syntax and an encoding. The name is an administratively assigned object ID specifying an object type. The object type together with the object instance serves to uniquely identify a specific instantiation of the object. For example, if object 610 is information about models of cars, then one instance of that object would provide user 100 with information about a specific model of the car while another instance would provide information about a different model of the car. The syntax of an object type defines the abstract data structure corresponding to that object type. Encoding of objects defines how the object is represented by the object type syntax while being transmitted over the network.

C. Management and Administration

Figure 7:
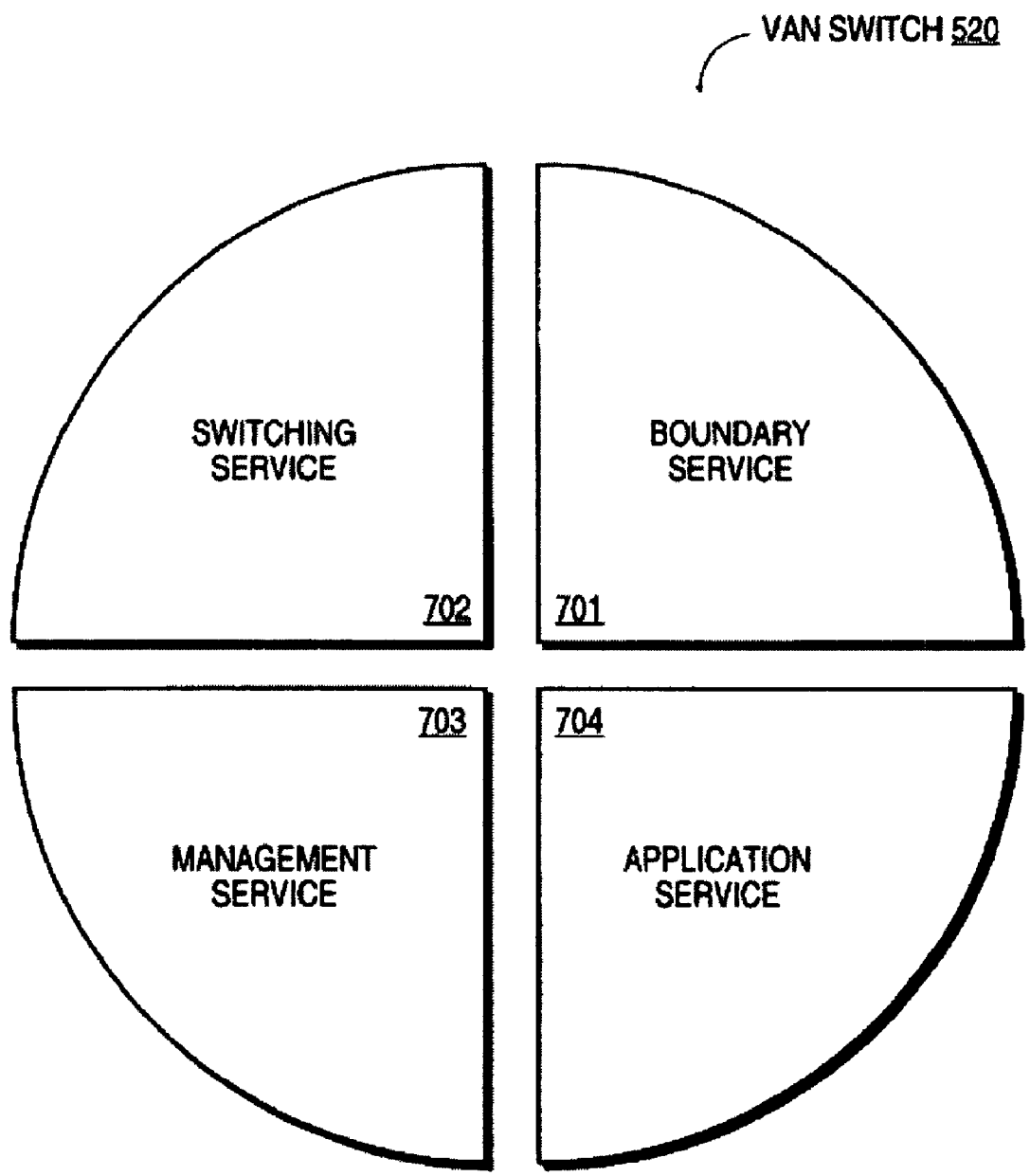
FIG. 7 illustrates conceptually the layered architecture of a VAN switch.

As described above, exchange 501 and management agent 601 together constitute a VAN switch. FIG. 7 illustrates conceptually the layered architecture of VAN switch 520. Specifically, boundary service 701 provides the interfaces between VAN switch 520, the Internet and the Web, and multi-media end user devices such as PCs, televisions or telephones. Boundary service 701 also provides the interface to the on-line service provider. A user can connect to a local application, namely one accessible via a local VAN switch, or be routed or "switched" to an application accessible via a remote VAN switch.

Switching service 702 is an OSI application layer switch. Switching service 702 thus represents the core of the VAN switch. It performs a number of tasks including the routing of user connections to remote VAN switches, described in the paragraph above, multiplexing and prioritization of requests, and flow control. Switching service 702 also facilitates open systems' connectivity with both the Internet (a public switched network) and private networks including back office networks, such as banking networks. Interconnected application layer switches form the application network backbone. These switches are one significant aspect of the present invention.

Management service 703 contains tools such as Information Management Services (IMS) and application Network Management Services (NMS). These tools are used by the end users to manage network resources, including VAN switches. Management service 703 also provides applications that perform Operations, Administration, Maintenance & Provisioning (OAM&P) functions. These OAM&P functions include security management, fault management, configuration management, performance management and billing management. Providing OAM&P functions for applications in this manner is another significant aspect of the present invention.

Finally, application service 704 contains application programs that deliver customer services. Application service 704 includes POSvc applications such as Bank POSvc described above, and illustrated in FIG. 6A. Other examples of VAN services include multi-media messaging, archival/retrieval management, directory services, data staging, conferencing, financial services, home banking, risk management and a variety of other vertical services. Each VAN service is designed to meet a particular set of requirements related to performance, reliability, maintenance and ability to handle expected traffic volume. Depending on the type of service, the characteristics of the network elements will differ. VAN service 704 provides a number of functions including communications services for both management and end users of the network and control for the user over the user's environment.

Figure 8:
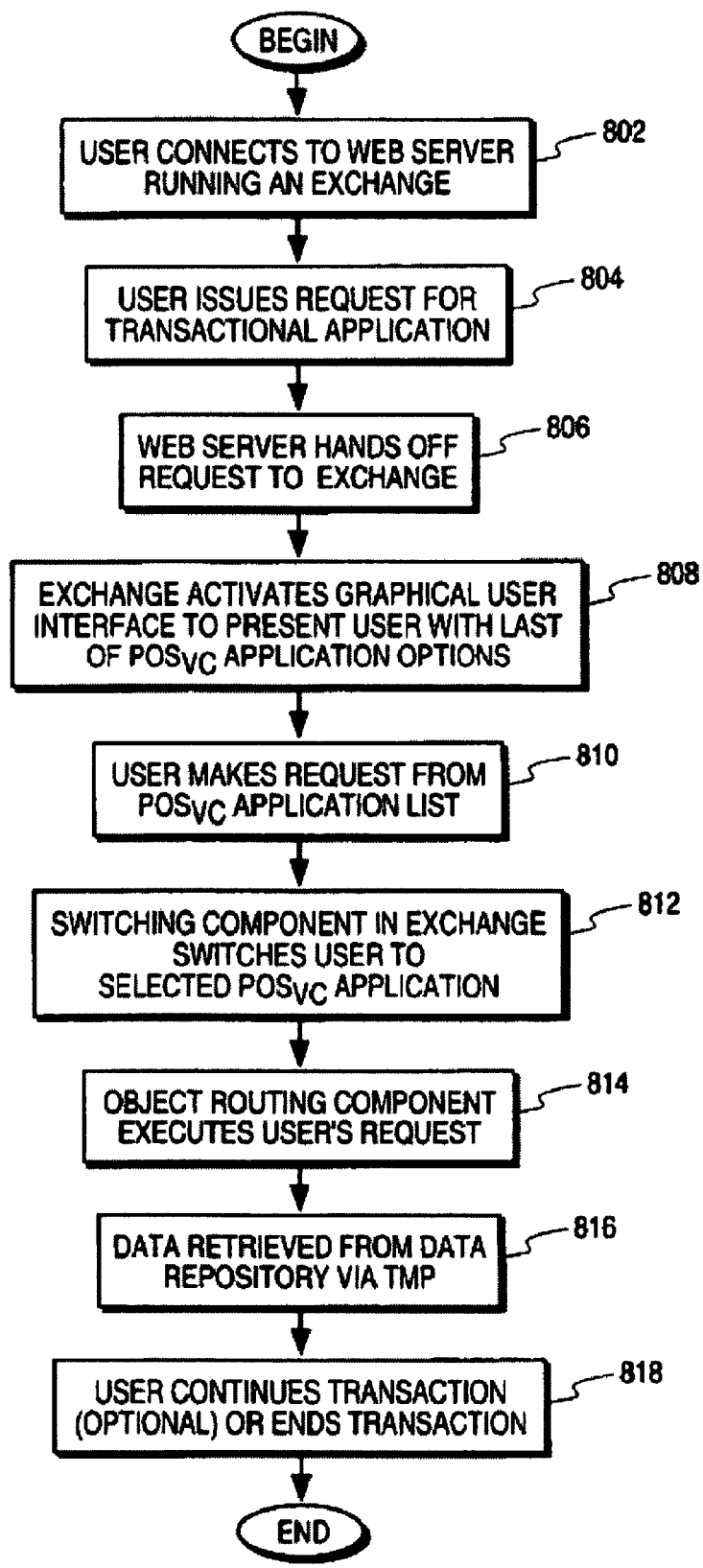
FIG. 8 is a flow diagram illustrating one embodiment of the present invention.

FIG. 8 is a flow diagram illustrating one embodiment of the present invention. A user connects to a Web server running an exchange component in step 802. In step 804, the user issues a request for a transactional application, and the web server hands off the request to an exchange in step 806. The exchange activates a graphical user interface to present user with a list of POSvc application options in step 808. In step 810, the user makes a selection from the POSvc application list. In step 812, the switching component in the exchange switches the user to the selected POSvc application, and in step 814, the object routing component executes the user's request. Data is retrieved from the appropriate data repository via TMP in step 816, and finally, the user may optionally continue the transaction in step 818 or end the transaction.

Thus, a configurable value-added network switching and object routing method and apparatus is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for completing a real-time Web transaction from a Web application in an on-line service over a digital network on the Web, the method comprising:

displaying at least one Web application specific to an on-line service over a digital network on the Web, wherein the Web application is a point-of-service (POSvc) Web application, and further wherein the digital network is an overlay service network running on top of an IP-based facilities network selected from a group consisting of the physical TCP/IP-based Internet, the Web and email networks, wherein the facilities network is a physical network;

accepting a first signal comprising a request from the point-of-service (POSvc) Web application for a real-time Web transaction specific to a Web merchant's value-added network service on the Web offered as the online service over the digital network on the Web;

utilizing one or more objects in the Web application and the information entries and the attributes of the one or more objects, wherein the one or more objects are one or more individual data structures in and specific to the POSvc Web application in said request, wherein the individual data structure in the POSvc Web application is an object identity with the information entries and attributes specific to the Web transaction request from the Web application, to connect in real-time to the value-added network service of the Web merchant without executing Common Gateway Interface (CGI) scripts;

executing said connection at the OSI application layer, utilizing application layer routing of the object identity with the information entries and attributes over the service network on the Web, and further wherein the object in the POSvc Web application is not an SNMP object;

routing the one or more individual data structures in the POSvc Web application together with said information entries and attributes from said Web application over the service network on the Web, wherein the routing the one or more individual data structures in the POSvc Web application together with said information entries and attributes from said Web application over the service network on the Web is object routing on the World Wide Web performed as OSI application layer routing, distinct from routing at the transport layer of the OSI model or network layer of the OSI model or lower layers of the OSI model;

managing the connection between said Web transaction request from the POSvc Web application and the Web merchant's services from end-to-end in real-time; and completing a real-time Web transaction from said Web application, wherein the online service is a loan Web application.

2. An apparatus for completing a real-time Web transaction from a Web application in an on-line service over a digital network on the Web, the apparatus comprising:

a processor;

a machine-readable storage device including one or more instructions executable by the processor for accepting a first signal comprising a request from a point-of-service (POSvc) Web application for a real-time Web transaction specific to a Web merchant's value-added network service on the Web;

utilizing an object in the Web application and the information entries and the attributes of an individual data structure in the POSvc Web application in said request to connect in real-time to the value-added network service of the Web merchant without executing Common Gateway Interface (CGI) scripts, and further wherein the object in the POSvc Web application is not an SNMP object;

executing said connection at the OSI application layer, routing said individual data structure with the information entries and attributes together from said Web application over the service network on the Web, wherein said individual data structure in the POSvc Web application in said request is an object identity in the POSvc Web application, and further wherein said routing performed at the OSI application layer is distinct from routing at the transport layer of the OSI model or network layer of the OSI model or lower layers of the OSI model; and completing a real-time Web transaction from said Web application.

3. A machine-readable storage device including instructions executable by a processor, the machine-readable storage device including one or more instructions for:
  accepting a first signal comprising a request from a point-of-service (POSvc) Web application for a real-time Web transaction specific to a Web merchant's value-added network service on the Web; from
  utilizing one or more objects in the Web application and the information entries and the attributes of the one or more objects, wherein the one or more objects are one or more individual data structures in and specific to the POSvc Web application in said request, wherein the object identity in the Web application is the individual data structure in the POSvc Web application, to connect in real-time to the value-added network service of the Web merchant without executing Common Gateway Interface (CGI) scripts:
  executing said connection at the OSI application layer, utilizing application layer routing on the Web;
  routing the one or more individual data structures in the POSvc Web application together with said information entries and attributes from said Web application over a service network on the Web running on top of a facilities network selected from a group consisting of the physical TCP/IP-based Internet, the Web and email networks, wherein the routing the one or more individual data structures in the POSvc Web application from said Web application over the service network on the Web performed as OSI application layer routing is object routing on the World Wide Web, distinct from routing at the transport layer of the OSI model or network layer of the OSI model or lower layers of the OSI model;
  managing the connection between said real-time Web transaction request and the Web merchant's services from end-to-end in real-time; and
  completing a real-time Web transaction from said Web application, wherein the online service is a loan Web application.

4. The method of claim 1, wherein said object in the Web application with said information entries and attributes in a real-time Web transaction is routed over the service network on the Web in the application layer of the OSI model as an encapsulated whole, wherein the object is the object identity specific to the Web application in the real-time Web transaction, and further wherein the encapsulated whole including the object identity with both information entries and attributes.

5. The apparatus of claim 2, wherein said value-added network service is a value-added network application on the Web, wherein the value-added network application resides at the transaction network entry point on the Web, and further wherein the value-added network application on the Web is a business banking Web application offered as a business banking on-line service on the Web, and wherein the business banking on-line service on the Web allows a real-time Web transaction from the value-added network application on the Web offered by a Web banking on-line service provider.

6. The apparatus of claim 2, providing real-time access from multi-media devices to any Web application specific to the Web merchant's services on the Web in a value-added service network on the Web to perform said real-time Web transactions from the Web application.

7. The apparatus of claim 2, wherein the value-added network service is a travel reservation Web application for completing real-time Web transactions on the service network on the Web.

8. The apparatus of claim 2, wherein the value-added network service is an on-line banking Web application for the transfer of funds in real-time between accounts on the Web.

9. The apparatus of claim 2, wherein one or more participants interact with each other in any real-time Web transaction through any Web application on any device in a real-time exchange between a group selected from participants, devices, participants with devices, devices with devices, participants with applications, devices with applications, applications with applications and applications on any on-line service network atop the Web.

10. The apparatus of claim 2, utilizing a distributed control on the Web in the real-time Web transaction request, wherein the real-time Web transaction request is handed over to an Exchange, wherein the Exchange manages in real-time the connection between the real-time Web transaction request and any commercial service, wherein the commercial service is an online service operating across a digital network, wherein the digital network is a value-added service network atop the Web.

11. The apparatus of claim 2, utilizing an Internet communications device, wherein the Internet communications device is a cellular device accessing a Web application on a value-added service network atop the Web.

12. The apparatus of claim 2, wherein the object identity in the Web application in the real-time Web transaction is a networked object, wherein the networked object is an individual data structure connecting between a point-of-service Web application and a back-end application over an OSI Application layer network on the Web for completing real-time, bi-directional Web transactions, wherein the OSI application layer network on the Web is the service network running on top of the facilities network.

13. The apparatus of claim 2, wherein the a car rental Web application is offered as an on-line service on the Web by a Web merchant, and further wherein the car rental Web application is a value-added network application accessible in real-time on the Web.

14. The apparatus of claim 2, wherein the Web application is an insurance Web application offered as an on-line service on the Web by a financial services' company for performing real-time Web transactions to access and purchase insurance products.

15. The apparatus of claim 2, wherein the value-added network service is a commercial loan Web application.

16. The apparatus of claim 2, wherein said Web application is an Internet cloud application enabling a network of participants interacting in real-time with one or more Web applications through any real-time Web transaction.

17. The apparatus of claim 2, wherein the value-added network service is a retail banking Web application.

18. The apparatus of claim 2, wherein a real-time Web transaction is performed from a group selected from brokerage Web application, trading account Web application, mortgage banking Web application, commercial banking Web application, commercial real estate loan banking Web application, cash management Web application, credit card Web application, direct deposit Web application, commercial lending Web application, mutual funds and annuities Web application and any Internet cloud Web application.

19. The apparatus of claim 2, wherein a real-time Web transaction is performed from an asset and wealth management point-of-service Web application in an on-line Web banking service from a cellular device.

* * * * *